(12) United States Patent
Navarro Arranz et al.

(10) Patent No.: US 11,560,117 B2
(45) Date of Patent: Jan. 24, 2023

(54) VEHICLE OCCUPANT RESTRAINT SYSTEM HAVING AN AIRBAG MODULE AND METHOD FOR ASSEMBLING AN AIRBAG

(71) Applicant: Dalphi Metal Espana, S.A., Vigo (ES)

(72) Inventors: Antonio Navarro Arranz, Valladolid (ES); Ramon Ramos Agustin, Viana de Cega (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 16/649,750

(22) PCT Filed: Oct. 8, 2018

(86) PCT No.: PCT/EP2018/077325
§ 371 (c)(1),
(2) Date: Mar. 23, 2020

(87) PCT Pub. No.: WO2019/076666
PCT Pub. Date: Apr. 25, 2019

(65) Prior Publication Data
US 2020/0276954 A1 Sep. 3, 2020

(30) Foreign Application Priority Data

Oct. 20, 2017 (DE) ..................... 10 2017 124 576.6

(51) Int. Cl.
*B60R 21/237* (2006.01)
*B60R 21/214* (2011.01)
(Continued)

(52) U.S. Cl.
CPC .......... *B60R 21/237* (2013.01); *B60R 21/214* (2013.01); *B60R 21/231* (2013.01);
(Continued)

(58) Field of Classification Search
CPC ... B60R 21/237; B60R 21/206; B60R 21/214; B60R 21/231; B60R 21/2338;
(Continued)

(56) References Cited

U.S. PATENT DOCUMENTS 9,180,832 B2 * 11/2015 Le Norcy ........... B60R 21/2338
2002/0024200 A1 2/2002 Eckert et al.
(Continued)

FOREIGN PATENT DOCUMENTS

DE 102007023816 B4 * 11/2008
DE 102014005827 10/2015
(Continued)

*Primary Examiner* — Keith J Frisby
(74) *Attorney, Agent, or Firm* — Tarolli, Sundheim, Covell & Tummino LLP

(57) ABSTRACT

A vehicle occupant restraint system comprises an airbag module (12) including an inflator (18) and a frontally acting airbag (16), wherein the airbag (16) includes an inflator-side inflation end (46) as well as a first free end (56) located in the inflated state of the airbag (16) within a vehicle interior. In a first period during deployment of the airbag (16), the first free end (56) is still connected via a tether (74) to the airbag module (12), wherein the tether (74) becomes detached upon reaching a predetermined tensile force. When folding the airbag (16), the non-inflated airbag (16) is spread so that a second free end (58) is maximally distant from the inflation end (46) and a first outer wall portion is stretched in the longitudinal direction of the airbag (16), and the first free end (56) is located in the vicinity of the inflation end (46) and a second outer wall portion is stretched in the longitudinal direction of the airbag (16), wherein a third outer wall portion of the airbag (16) is folded back onto itself at least in a portion. The two lateral areas of the spread airbag (16) are folded toward the center, and subsequently the airbag (16) is rolled up from the second free end (58).

19 Claims, 23 Drawing Sheets

(51) Int. Cl.
*B60R 21/231* (2011.01)
*B60R 21/2338* (2011.01)

(52) U.S. Cl.
CPC .. *B60R 21/2338* (2013.01); *B60R 2021/2375* (2013.01); *B60R 2021/23382* (2013.01); *B60R 2021/23388* (2013.01)

(58) Field of Classification Search
CPC .......... B60R 21/213; B60R 2021/0051; B60R 2021/23169; B60R 2021/23388; B60R 2021/23382; B60R 2021/23384; B60R 2021/23386
USPC .............................................. 280/732, 743.2
See application file for complete search history.

(56) References Cited

U.S. PATENT DOCUMENTS

| | | | |
|---|---|---|---|
| 2010/0156074 A1 | 6/2010 | Kukbo et al. | |
| 2014/0159353 A1* | 6/2014 | Stemp | B60R 21/206 280/730.1 |
| 2017/0043738 A1 | 2/2017 | Peyre et al. | |
| 2017/0113646 A1 | 4/2017 | Lee et al. | |
| 2017/0174173 A1 | 6/2017 | Peyre et al. | |

FOREIGN PATENT DOCUMENTS

| | | | | |
|---|---|---|---|---|
| DE | 102014005827 A1 * | 10/2015 | ......... | B60R 21/2338 |
| JP | 2016037129 A * | 3/2016 | | |

\* cited by examiner

VEHICLE OCCUPANT RESTRAINT SYSTEM HAVING AN AIRBAG MODULE AND METHOD FOR ASSEMBLING AN AIRBAG

RELATED APPLICATIONS

This application is a U.S. National Stage Application filed under 35 U.S.C. § 371 of PCT/EP2018/077325, filed Oct. 8, 2018, and entitled VEHICLE OCCUPANT RESTRAINT SYSTEM HAVING AN AIRBAG MODULE AND METHOD FOR ASSEMBLING AN AIRBAG, which International Application claims the benefit of priority from German Patent Application No. 10 2017 124 576.6, filed on Oct. 20, 2017. The entire contents of each of the above-identified patent applications are incorporated herein by reference.

BACKGROUND OF THE INVENTION

The invention relates to a vehicle occupant restraint system comprising an airbag module and a method of folding an airbag of the airbag module.

For protecting the vehicle occupants, very successfully airbags have been employed. Before being used, they are accommodated behind a vehicle lining out of which they will deploy. However, especially front airbags frequently have a large filling volume and an irregular three-dimensional configuration, which impedes smooth deployment into the vehicle interior.

SUMMARY OF THE INVENTION

It is the object of the invention to improve deployment and positioning of the inflating airbag within the vehicle interior.

This is achieved by a vehicle occupant restraint system comprising the features of claim 1. The vehicle occupant restraint system comprises an airbag module including an inflator and a frontally acting airbag. The airbag includes an inflator-side inflation end as well as a first free end delimiting a restraint part of the airbag, wherein the restraint part comprises a major part of the inflatable volume of the airbag and the first free end in the inflated state of the airbag is located within a vehicle interior. In a first period during deployment of the airbag, the first free end is still connected to the airbag module in the area of the inflation end via a tether. Upon reaching a predetermined tensile force, the tether becomes detached and releases the first free end. In this way, the deployment behavior as well as the order of filling of different airbag zones can be specifically influenced.

The airbag module is especially arranged on a passenger side of the vehicle at the ceiling beneath a roof liner in the area of a sun visor so that the airbag deploys from above along the windshield.

The tether preferably is a piece of fabric which is connected to the airbag on one side and on the other opposite side is fastened in the area of the inflation end, for example directly on the inflator.

The tether advantageously includes a weakened zone at which the tether splits when exceeding a predetermined tensile force and releases the first end of the airbag. The predetermined tensile force is reached at the end of the first period. In this way, the first free end can be restrained for about several milliseconds after activation of the inflator in the area of the inflator.

In a preferred embodiment, at the inflation end the airbag includes a neck which, when viewed in the transverse vehicle direction, is narrower than the adjacent restraint part of the airbag. The neck is inflatable and connects the restraint part to the inflator, but in the normal case does not contribute to the restraining effect of the airbag. As the neck is designed to be narrower and also shorter especially in the longitudinal direction of the airbag than the adjacent restraint part, material, space and filling volume can be saved.

In general, the inflator may be a known tubular inflator which is arranged in the airbag module so that its longitudinal axis is perpendicular to the longitudinal module direction of the airbag module, wherein the longitudinal module direction in the mounted state of the airbag module coincides with a deployment direction of the airbag out of the airbag module and points approximately in the longitudinal vehicle direction.

The width of the neck may be approximately in conformity with the length of the inflator, for example.

In an initial state prior to activation of the inflator, the airbag is folded into an airbag package which preferably comprises a folded main portion and a folded connecting portion, the main portion containing the folded restraint part and the connecting portion containing the folded neck. Thus, the neck and the restraint part are folded into separate package portions which are connected, for example, via a short, unfolded piece of the two-ply airbag.

Advantageously, the connecting portion and the main package are folded and positioned in the airbag package so that, after activating the inflator, at first the neck will fill, thus causing the connecting portion to stretch and deploy and causing the folded main package to be moved in the direction of the vehicle interior. The neck in this case is used to move the still largely folded restraint part of the airbag into the vehicle interior, wherein it can deploy, unobstructed by lining parts, into its final position and shape.

The neck is folded for this purpose in a mere zigzag folding, for example with about one to three zigzag folds, wherein the inflator, the connecting portion and the main package are disposed on a straight line linearly in series in the longitudinal module direction so as to be able to exploit the thrust effect of the stretching connecting portion for ejecting the main package.

The tether should remain intact at least until the main package starts to deploy in the vehicle interior.

In the completely inflated state, the airbag extends for example within the vehicle interior from an area of the sun visor along a windshield to and over an instrument panel toward a vehicle occupant. The first free end especially forms a lower end of the airbag facing the vehicle occupant and may also constitute a lower end of a baffle for the vehicle occupant. Thus, the airbag bears against the windshield and the instrument panel.

The airbag preferably includes a second free front end which in the completely inflated state is located at a transition of the windshield to the instrument panel.

In order to impart this shape to the airbag, the airbag may have a first outer wall portion which extends from the inflation end to the second free end and forms a bearing surface against the windshield as well as a second outer wall portion which extends from the second free end to the first free end over the instrument panel and a third outer wall portion which at least partially faces the first and second outer wall portions and which extends from the first free end to the inflation end and forms a baffle for the vehicle occupant. The joined but not inflated airbag cannot be spread completely flatly in such way that merely two airbag layers are superimposed at a time, but also in the non-inflated state to some degree takes a three-dimensional shape in which partially four layers of the airbag are superimposed.

In addition, preferably in the non-inflated deployed state of the airbag the third outer wall portion is provided with an inwardly folded bag in an area of the transition from the first to the second outer wall portion.

The bottom of the inwardly folded bag is connected to the second free end especially via a tether. The tether is located inside the airbag and preferably remains intact even in the completely inflated state of the airbag.

On the one hand, the bag may contribute to the inflated form of the airbag and, on the other hand, may back stabilization and positioning of the inflated airbag, especially via the tether, in the desired position within the vehicle interior.

During deployment of the airbag out of the roof liner, the airbag extends, in a partially inflated state in which the tether is not yet detached, preferably along the windshield to the instrument panel, wherein the airbag is turned over from the second free end and extends back toward the inflator so that the airbag takes a U-shaped configuration having an outer leg and an inner leg.

The outer leg of the U, which is especially the leg directed toward the windshield, preferably is already partially filled with filling gas at the time when the tether becomes detached, while the inner leg of the U, which then is preferably directed toward the vehicle occupant, is still substantially unfilled.

This interim state is obtained by appropriately folding the airbag package as well as by the tether.

As afore-stated, the main package is folded so that the first free end is folded back to the inflation end. Moreover, the two lateral portions of the restraint part may be folded back to the center and subsequently may be rolled up. This helps achieve that at first an outer leg of the airbag is filled which extends from the inflation end to a second free end of the airbag which, in the inflated state, is located approximately in the transition from the windshield to the instrument panel. On the other hand, the filling gas at first substantially does not yet flow into an inner leg of the airbag extending from the inflation end to the first free end of the airbag. This is obtained by folding the restraint part of the airbag and by the tether.

The outer leg is delimited e.g. toward the windshield by the first outer wall portion and inwardly, i.e. viewed in the direction of the vehicle occupant, is delimited by an inflator-side or inflation end-side part of the third outer wall portion.

In contrast, the inner leg is delimited e.g. toward the vehicle occupant by the second outer wall portion and, when viewed toward the windshield, is delimited by a part of the third outer wall portion extending toward the first free end.

In the fully inflated state, the airbag takes approximately a Y-shape or a T-shape, when viewed from the side, as the inner leg has folded downwards in the vehicle interior. The arms of the Y then are formed by two inflated portions of the restraint part which extend from the first and, resp., the second free end toward the inflation end and both of which merge into the neck.

During deployment the tether is preferably located on the side directed toward the vehicle occupant. This enables the tether not to be fastened on the baffle.

During deployment of the airbag, the tether extends, as long as it is intact, especially maximally about 5 to 50 cm from a roof liner of the vehicle into the vehicle interior. The tether thus is placed so that normally it will not get in contact with a vehicle occupant.

It is possible to fasten the tether on the airbag side not directly to the first free end but especially offset against the first free end by about 5 to 30 cm in the longitudinal direction of the airbag, viz. on the second outer wall portion. Thus, the baffle includes neither any remainders of the tether nor any tether fastening.

At the inflation end the airbag preferably includes an inserting hole for the inflator be closable by two opposite tabs, with each tab being adapted to be separately fastened to the inflator. Of preference, each tab includes a fastening hole for accommodating a fastening bolt projecting from the inflator. Moreover, each tab advantageously has a positioning hole for accommodating a positioning bolt asymmetrically disposed on the inflator for preventing faulty assembly of the inflator on the airbag in accordance with the Poka-Yoke principle.

Of preference, the tether is fixed to the inflator by an inflator-side end. Especially, the inflator-side end of the tether has the same arrangement of holes as the tabs of the inflation end of the airbag and, in this way, can be pulled over the fastening bolts (and the positioning bolt) of the inflator so as to tightly connect the tether to the inflator.

The afore-stated object is also achieved by a method of folding an airbag of a vehicle occupant restraint system as described in the foregoing. The method provides the following steps:

The non-inflated airbag is spread so that a second free end is maximally distant from the inflation end and the first outer wall portion is stretched in the longitudinal direction of the airbag, as well as the first free end is located in the vicinity of the inflation end and a second outer wall portion is equally stretched in the longitudinal direction of the airbag. The third outer wall portion of the airbag is folded back onto itself at least in one portion.

The two areas of the spread airbag lateral with respect to the longitudinal direction of the airbag are folded toward the center in a folding step, especially by Z-folding each having two folding lines.

After that, in a rolling step the airbag is rolled up from the second free end and the tether is fixed in the area of the inflation end.

By folding the first free end and fixing the first free end by the tether the inner leg is substantially prevented from being filled until the tether is detached. The tether preferably is intact until the airbag has completely unrolled. The airbag may be rolled up, for example, over about six revolutions.

The tether may be fixed to the inflator before or after folding and rolling the restraint portion of the airbag.

The neck of the airbag merging into the inflation end is preferably excluded from the step of rolling and is folded merely in zigzag folding, especially having one to three folds.

Depending on the length of the outer wall portions, it is possible to turn over the first free end prior to the rolling step and preferably already prior to the folding step once in the longitudinal direction of the airbag so as obtain a more compact airbag package.

In a possible configuration of the invention, the vehicle occupant restraint system comprises an airbag module that is mounted in the area of the roof liner of the vehicle on the passenger side, when viewed in the transverse vehicle direction, about centrally relative to the passenger seat and includes an airbag folded into an airbag package which, in the case of restraint, deploys between the windshield and the passenger so as to frontally absorb the passenger. The airbag package is arranged between the pivot axis of the sun visor and the windshield of the vehicle.

For mounting the airbag module on the roof rail, the inflator is accommodated in a holder C-shaped in cross-section of a module carrier mounted on the roof rail, wherein the arm of the C-shaped holder on the vehicle interior side does not substantially project from the inflator, however.

The folded airbag package is accommodated together with the inflator in a wrapping fastened on the inflator side via two retaining tabs to the fastening bolts of the inflator, while the main package of the folded airbag package is inserted in a holding bag and is retained there via an airbag package fixation formed at the wrapping. The airbag package fixation includes meshing first and second fixing elements which form a plug connection and both of which are formed exclusively from the material of the wrapping, especially an airbag fabric. The connecting portion is located outside the holding bag and is fixed by the retaining tabs in the folded state. For fixation on the vehicle, the wrapping includes one or more fixing portions which also facilitate prefixing to the vehicle body allowing the airbag module to be exactly positioned and the load-bearing fixations to be conveniently attached.

In the bottom of the holding bag of the wrapping a weakened zone is provided, for example, through which the main package of the folded airbag package can leave the airbag module and can deploy out of the roof liner into the vehicle interior.

All features described in connection with the invention can also be individually realized independently of each other or in any suitable combinations being at the discretion of those skilled in the art.

BRIEF DESCRIPTION OF THE DRAWINGS

Hereinafter, the invention shall be described in detail by way of an embodiment with reference to the enclosed Figures, wherein.

DESCRIPTION

Figure 1:
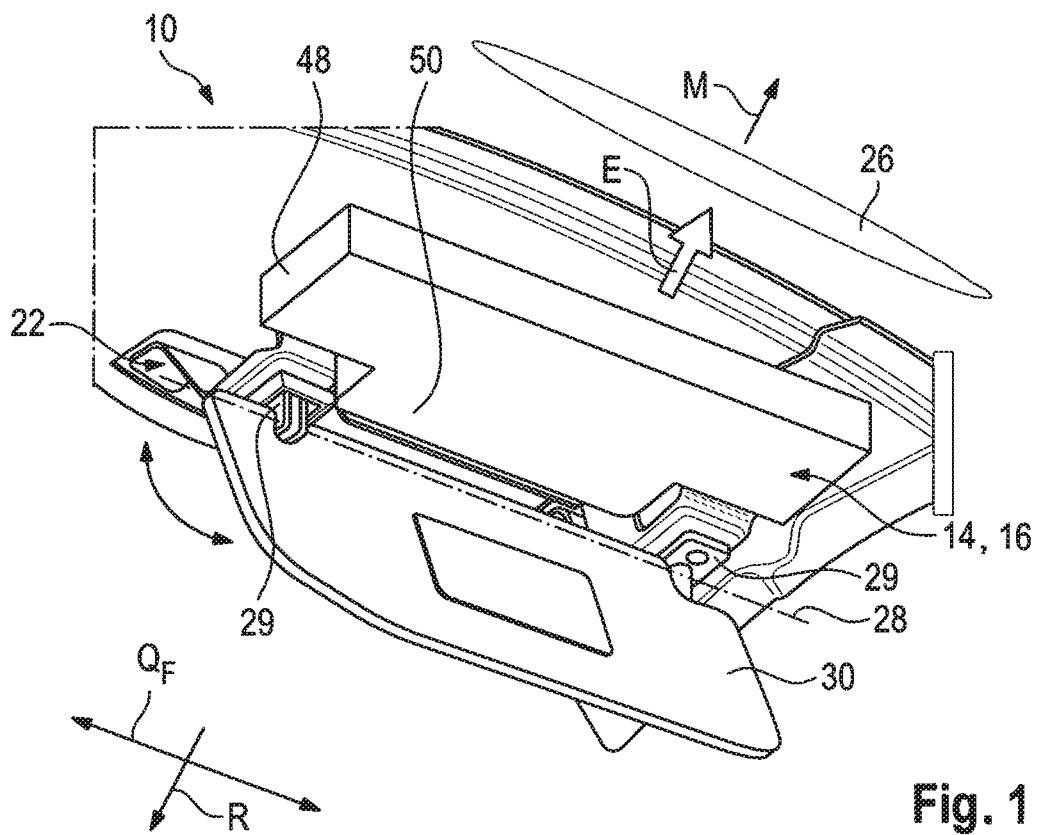
FIG. 1 shows a schematic perspective view of a vehicle occupant restraint system according to the invention comprising an airbag module mounted on a roof of the vehicle.
Figure 2:
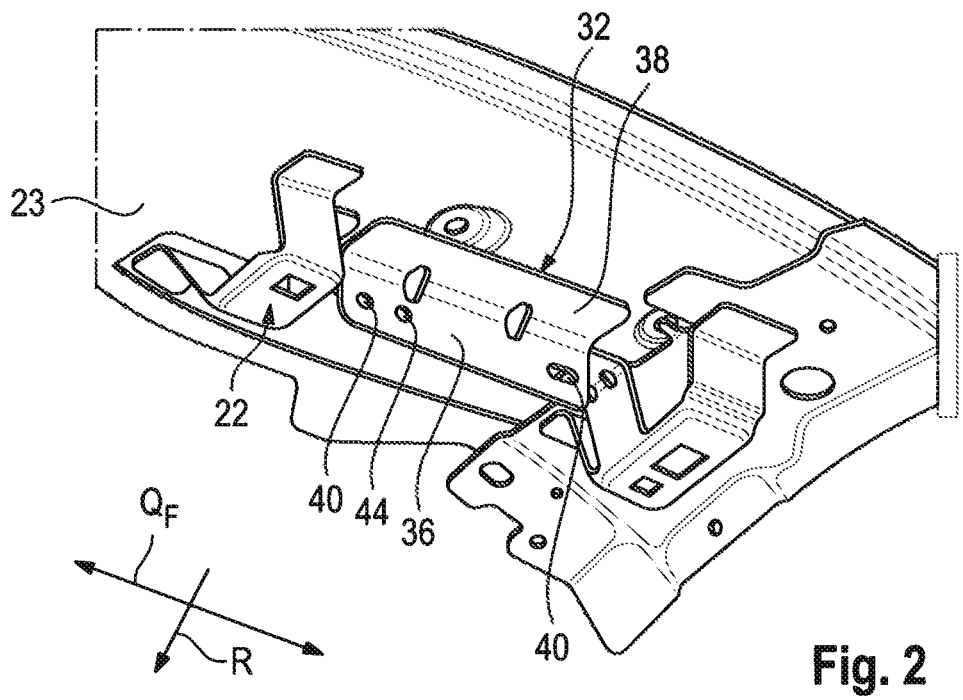
FIG. 2 shows a module carrier of the airbag module of FIG. 1 mounted on the vehicle roof.
Figure 3:
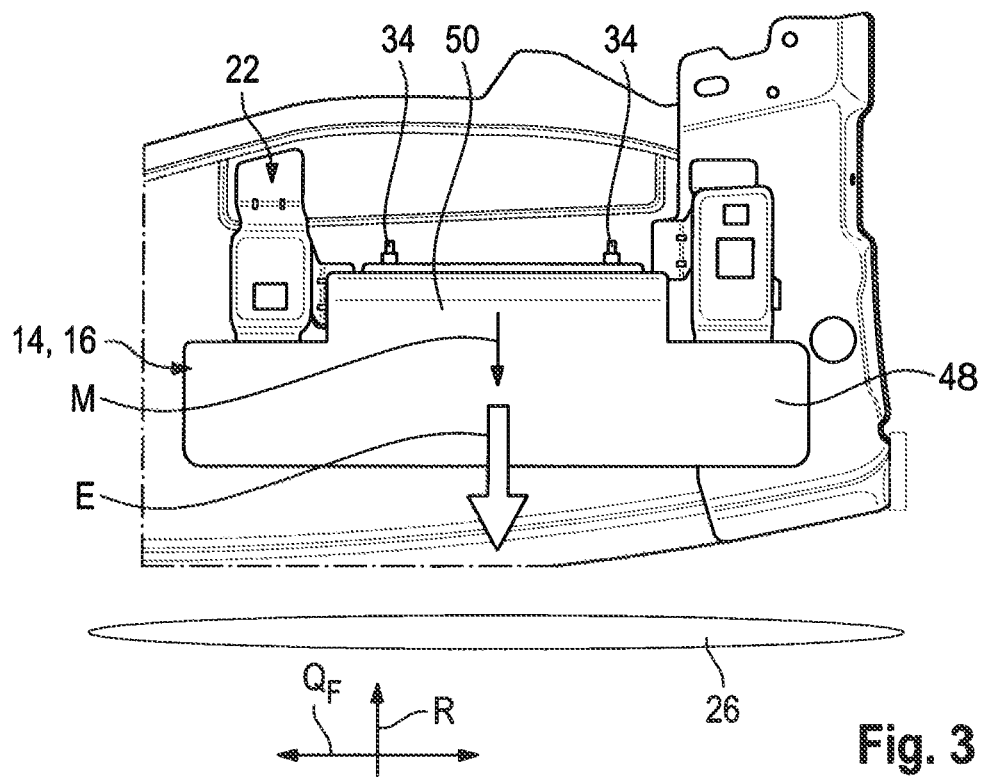
FIG. 3 shows a top view onto the airbag module of FIG. 1.
Figure 4:
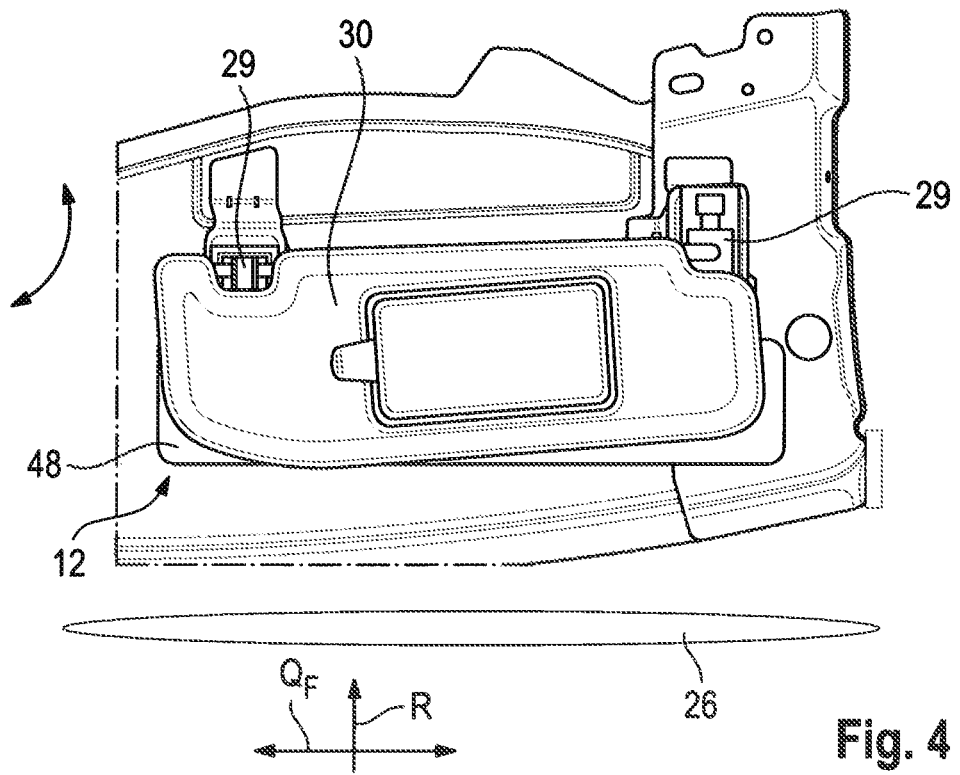
FIG. 4 shows the representation of FIG. 3 where additionally the sun visor is illustrated.
Figure 5:
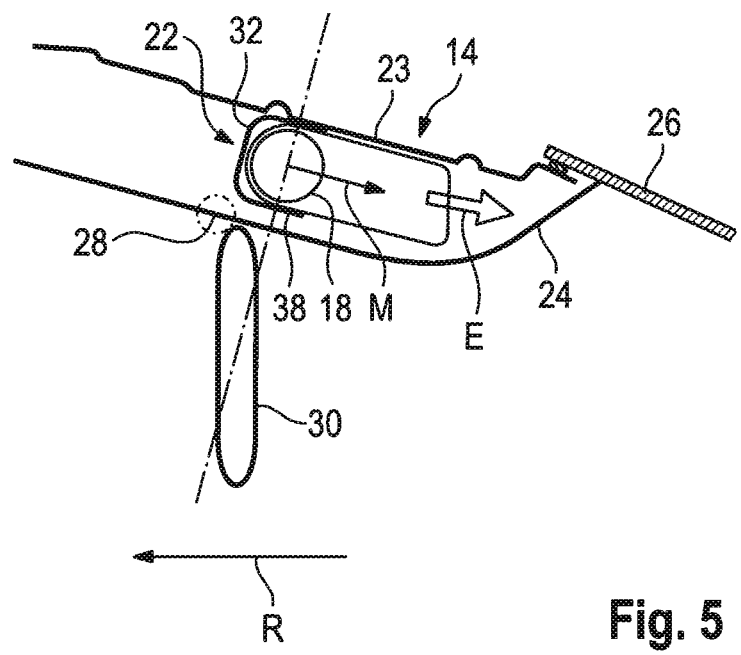
FIG. 5 shows a schematic sectional view of the vehicle occupant restraint system of FIG. 1 installed in the vehicle.
Figure 6:
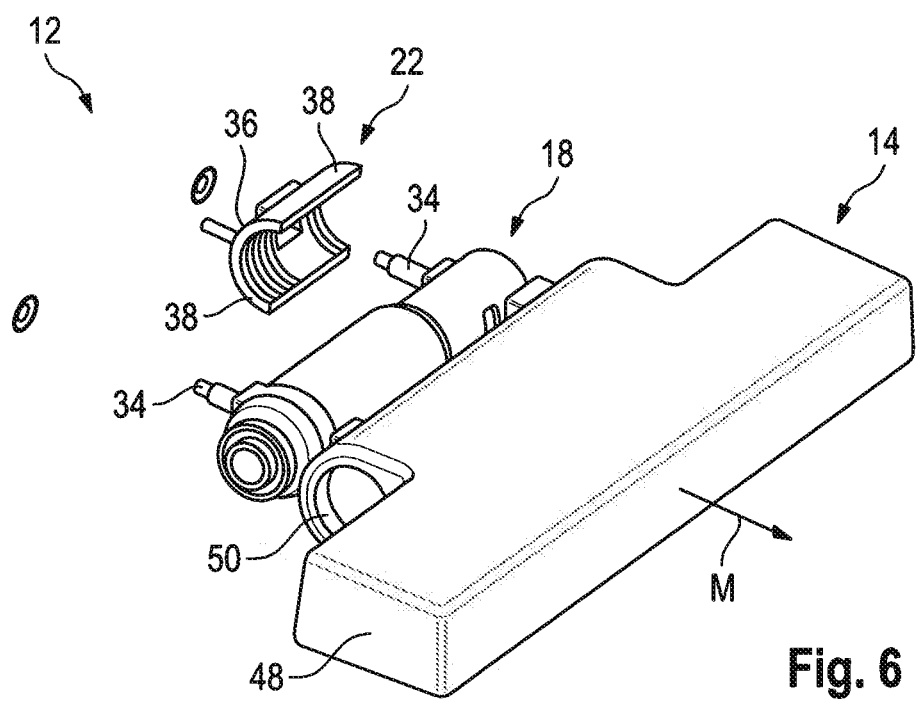
FIG. 6 shows a schematic exploded view of the airbag module of FIG. 1.

FIGS. 1 to 7 illustrate the structure of a vehicle occupant restraint system 10 which in this example is designed to protect a passenger especially of a passenger car during frontal crash.

The vehicle occupant restraint system 10 comprises an airbag module 12 (cf. especially FIGS. 5 to 7) including a frontally acting airbag 16 folded into an airbag package 14 as well as an inflator 18 which supplies filling gas for inflating the airbag 16. The inflator 18 is inserted in the airbag 16 and thus integrated in the airbag package 14.

Figure 29:
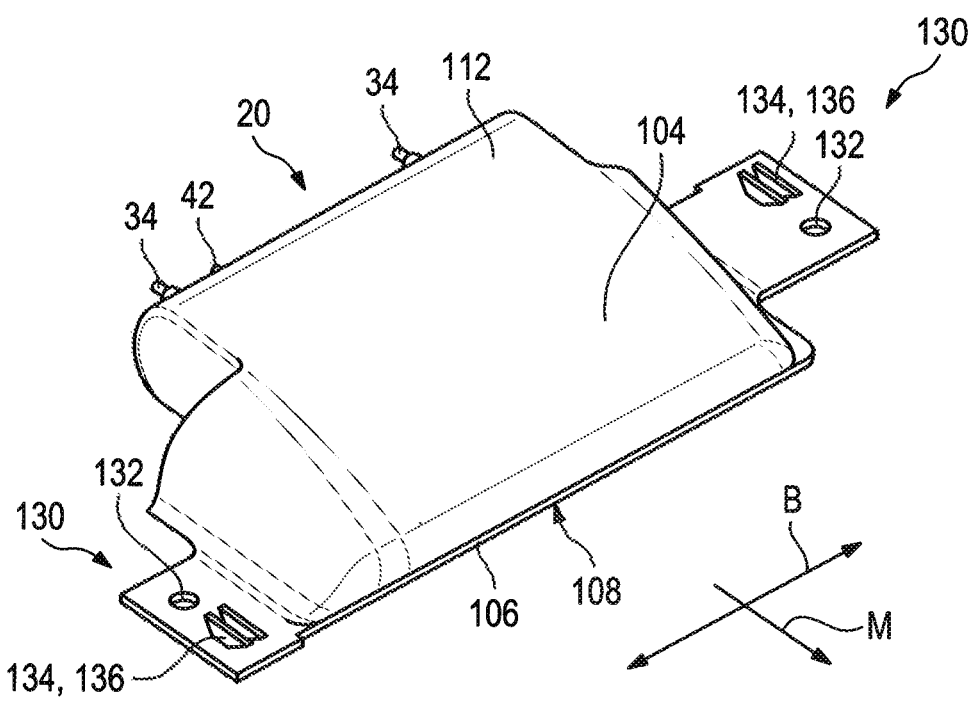
FIG. 29 shows a schematic perspective representation of the airbag package of FIG. 28 inserted in a wrapping.

The airbag package 14 and the inflator 18 are accommodated in a flexible wrapping 20 (see e.g. FIGS. 7 and 29) which will be described in detail further below and which has been omitted in FIGS. 1 to 6 for reasons of clarity.

Further, a module carrier 22 is provided (see FIGS. 2 and 6, for instance) via which the airbag module 12 is mounted tightly to the vehicle, for example to a roof rail 23 or any other rigid component in the roof area of the vehicle. The module carrier 22 is a formed sheet part, for example.

The airbag module 12 is arranged beneath a roof liner 24 (cf. e.g. FIG. 5), wherein it is located, when viewed along the longitudinal vehicle direction R, between a windshield 26 of the vehicle and a pivot axis 28 and, resp., the attachments 29 of a sun visor 30. The sun visor 30 may be pivoted about the pivot axis 28 as indicated e.g. in FIG. 1. The pivot axis 28 is not continuously physically realized. Instead, the sun visor 30 is pivotally attached to two attachments 29 at the roof liner (see FIGS. 1 and 4), wherein usually the sun visor 30 may be unhooked at the vehicle inward one of the two attachments 29 so as to laterally fold away the sun visor.

At least the folded airbag package 14 and, where appropriate, also the inflator 18 is/are located in the vehicle direction R, when viewed from the vehicle front end to the vehicle rear end, ahead of the pivot axis 28 of the sun visor 30.

A deployment direction E of the airbag 16 is directed along the longitudinal vehicle direction R in the direction of the vehicle front end and initially extends approximately in parallel to the vehicle roof and the windshield 26.

The airbag module 12 is located, when viewed in the transverse vehicle direction $Q_F$, on the passenger side approximately centrally above a passenger seat (not shown) so that the airbag 16 is capable of frontally absorbing the passenger. The airbag module 12 thus is disposed in the transverse vehicle direction $Q_F$ distant from the vehicle doors.

The module carrier 22 includes a holder 32 C-shaped in cross-section and encompassing the inflator 18 at the inflator-side end side of the airbag package 14.

The inflator 18 in this case is a known elongate tubular inflator, with two fastening bolts 34 radially projecting from the cylindrical outside thereof. The fastening bolts 34 are located on a rear side of the inflator 18, on the opposite front side discharge orifices (not shown) are provided through which the filling gas leaves the inflator 18 and flows directly into the airbag 16.

The inflator 18 is disposed in the airbag module 12 so that its longitudinal axis extends transversely to the longitudinal vehicle direction R approximately in the transverse vehicle direction $Q_F$ and thus approximately normal to a longitudinal module direction M and the deployment direction E of the airbag 16. The longitudinal module direction M can be defined approximately by an extension of a diameter of the inflator 18 which is determined by the fastening bolts 34.

In the module carrier 22, more exactly speaking in a longitudinal side 36 of the C-shaped holder 32 located between the two arms 38 of the C shape, fastening holes 40 (cf. FIG. 2) are provided through which the fastening bolts 34 are passing so as to fasten the inflator 18 and the airbag package 14 tightly to the module carrier 22. On the rear side, the fastening bolts 34 may be secured by nuts, for example.

Figure 7:
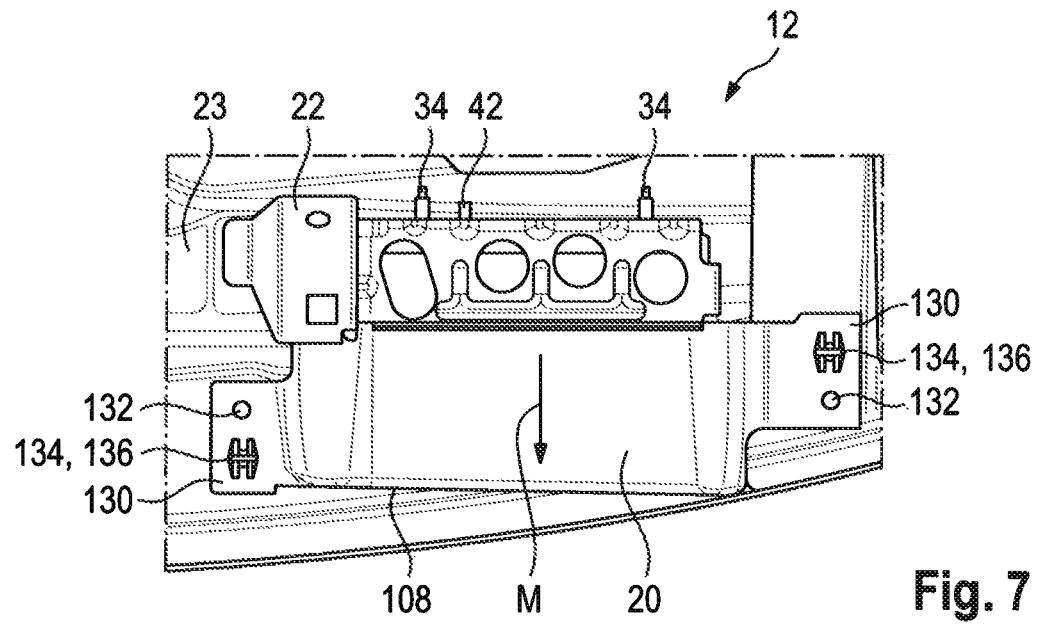
FIG. 7 shows a schematic top view onto the airbag module of FIG. 1 mounted on the roof.

In addition to the two fastening bolts 34, another bolt constituting a positioning bolt 42 is provided (see e.g. FIG. 7). A corresponding hole 44 is provided in the module carrier 22 (see FIG. 2). According to the Poka-Yoke principle, said positioning bolt 42 serves for preventing faulty assembly of the inflator 18.

Upon deployment of the airbag 16, filling gas flows from the inflator 18 into the airbag 16 through an inflation end 46 which is fastened on the inflator 18, as will be described in detail below. The pressure of the filling airbag 16 helps open the roof liner 24 either at a weakened zone or, for example, at the transition to the windshield 26 and allows the airbag 16 to exit into the vehicle interior. Accordingly, the roof liner 24 forms a lower delimitation of a passage for the airbag 16. An upper delimitation of said passage may be predefined by the roof rail 23. In this example, no further rigid guiding part such as a guiding plate is provided between the airbag 16 and the roof liner 24.

The arm 38 of the C-shaped holder 32 on the vehicle interior side does not extend, in the longitudinal vehicle direction R, beyond the outer wall of the inflator 18 and merely increases the stability of the module carrier 22 so that the latter deforms only insignificantly during deployment of the airbag 16, but does not contribute to directing the airbag 16 by directly contacting the airbag 16.

Due to its position on the roof rail 23, the deploying airbag 16 does not contact the sun visor 30 or the attachments 29 thereof, either, while it moves out into the vehicle interior.

Figure 8:
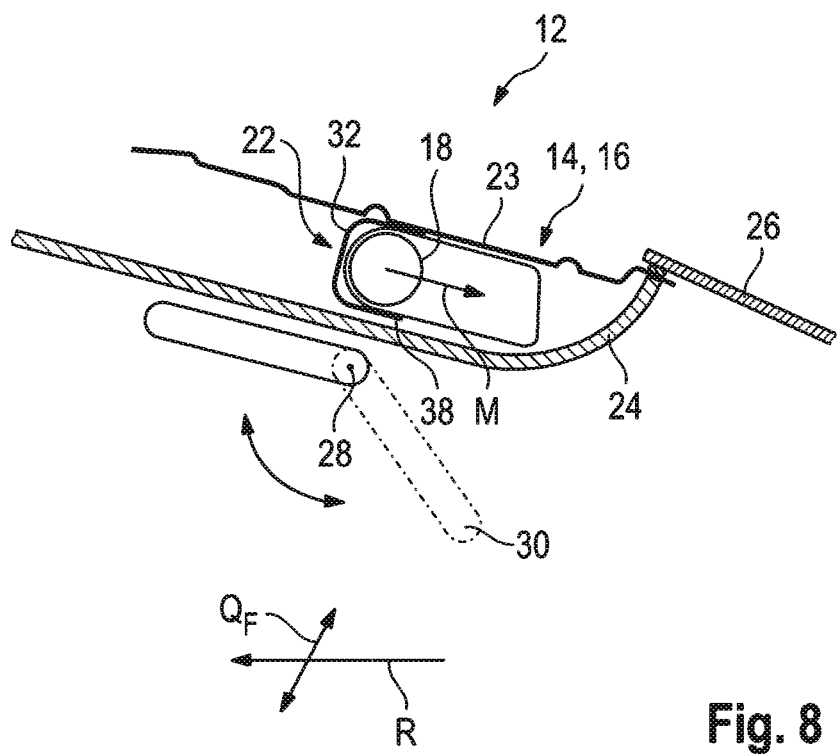
FIGS. 8 and 9 show the vehicle occupant restraint system of FIG. 1 in a schematic sectional view prior to deployment of the airbag and during the initial deployment phase of the airbag.
Figure 9:
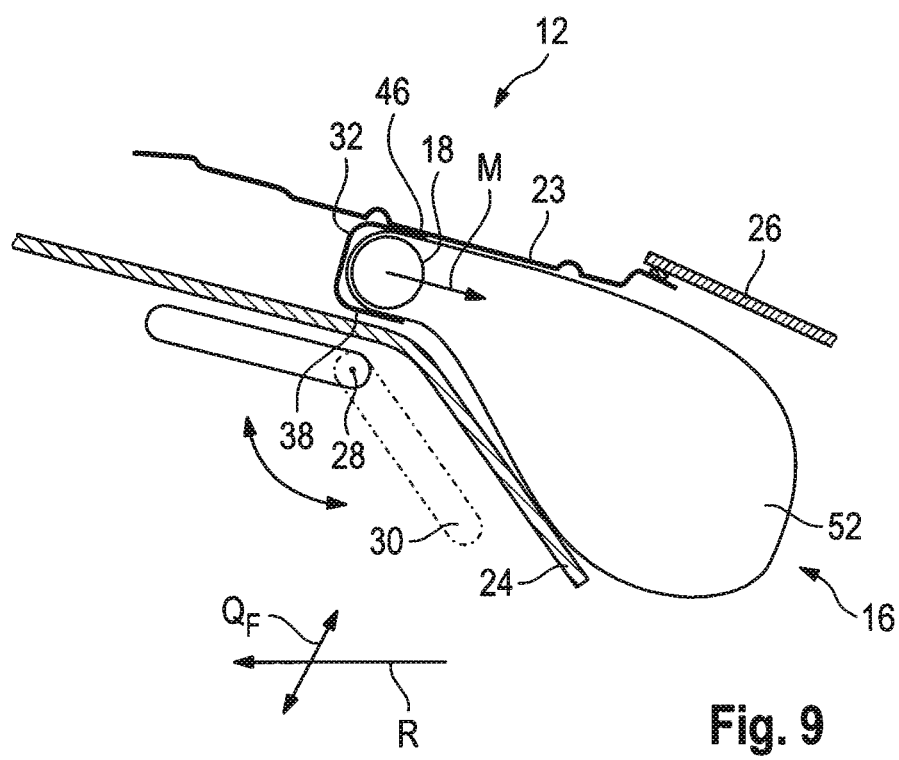

The initial deployment of the airbag 16 is illustrated in FIGS. 8 and 9.

FIGS. 10 to 17 show the deployment and the inflation of the airbag 16 in more detail. Although in FIGS. 11 to 17 the steering wheel is visible, this is only due to the lateral view chosen for representation. The airbag 16 deploys exclusively on the passenger side in this example and laterally beside the steering wheel.

Figure 10:
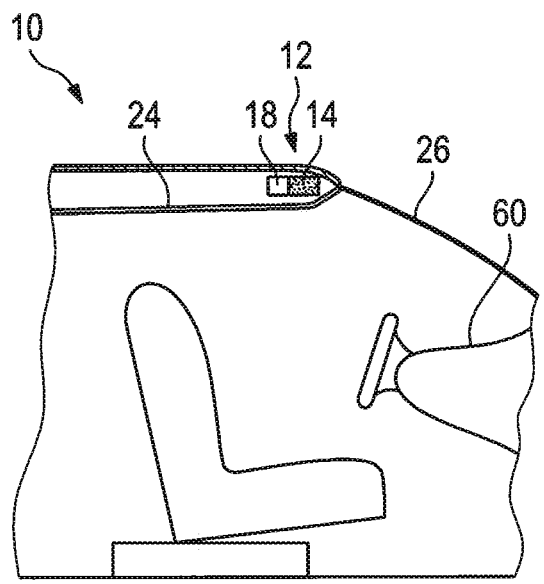
FIGS. 10 to 17 show the inflating operation of the airbag of the airbag module of FIG. 1 from the state prior to activation of the vehicle occupant restraint system to the completely inflated airbag in a schematic sectional view.
Figure 10:
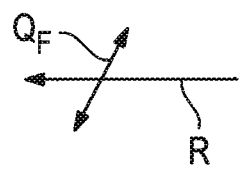

FIG. 10 shows the initial state prior to activation of the vehicle occupant restraint system 10.

The airbag package 14 initially lies folded beneath the closed roof liner 24. The airbag package 14 comprises two separately folded portions, viz. a main package 48 and a connecting portion 50 (indicated e.g. in FIGS. 1 and 3).

In the main package 48 a restraint part 52 of the airbag 16 is folded which in the deployed and inflated state comprises the major part of the airbag volume and which substantially determines the restraining effect of the airbag 16. This is evident e.g. from FIGS. 17 and 19.

Figure 19:
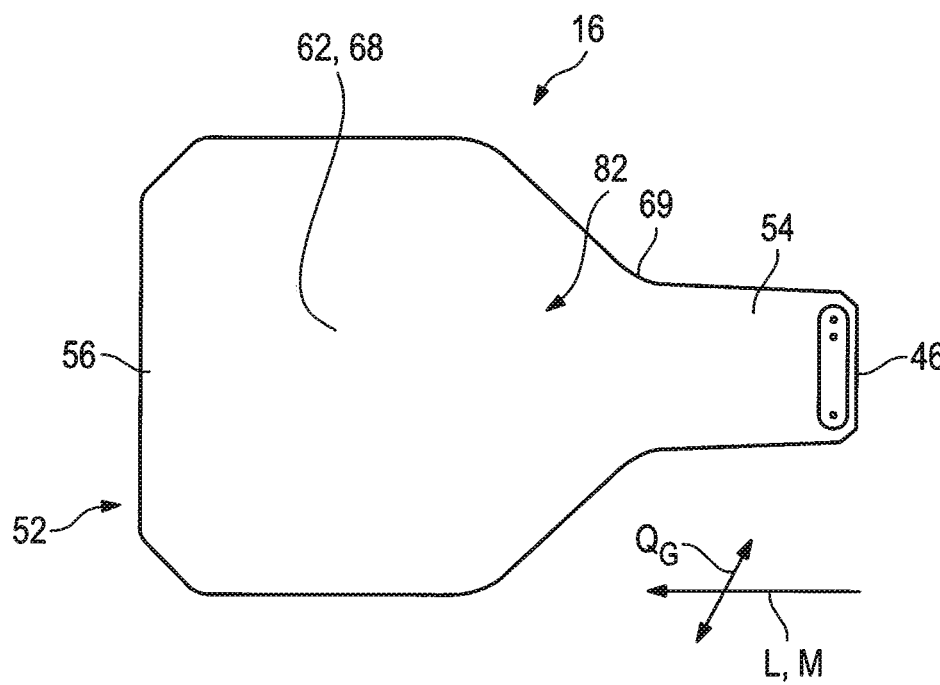
FIG. 19 shows the airbag of the vehicle occupant restraint system of FIG. 1 when being flatly spread in the non-inflated state in a top view onto a third outer wall portion of the airbag.
Figure 20:
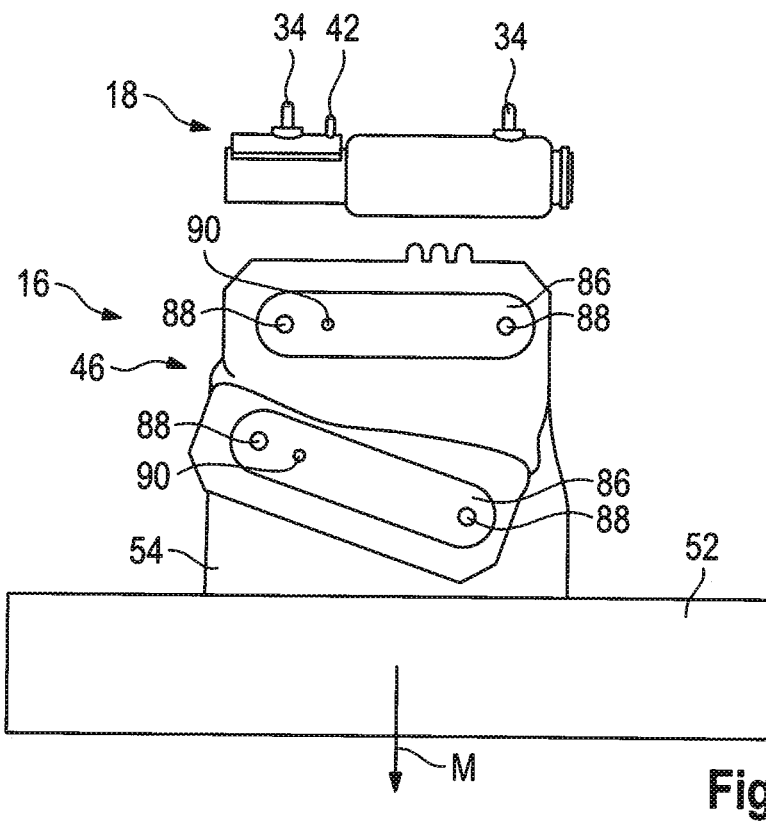
FIGS. 20 to 23 show a schematic representation of the insertion of an inflator into an inflation end of the airbag of the vehicle occupant restraint system of FIG. 1.
Figure 21:
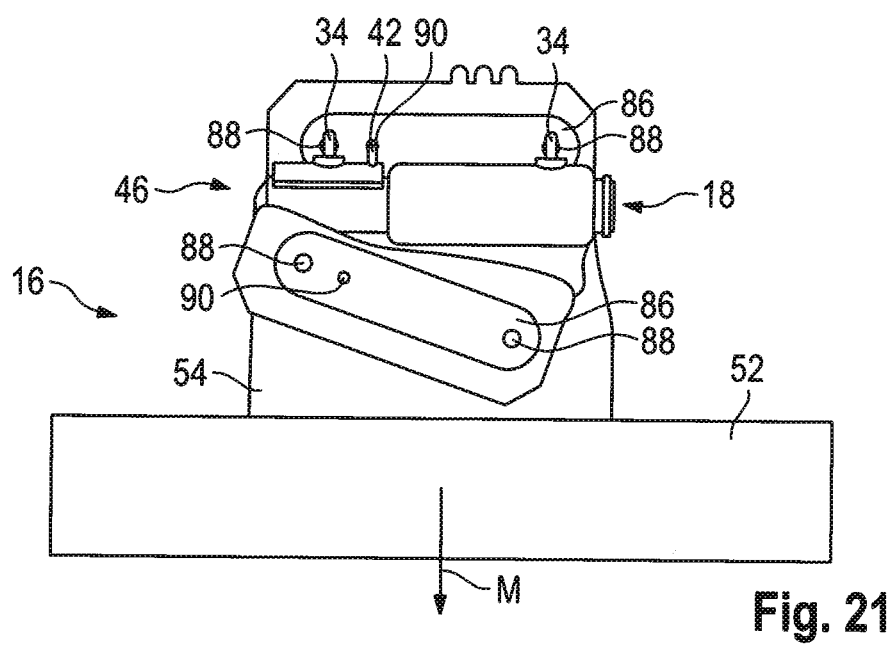

In the connecting portion 50 a neck 54 of the airbag 16 formed between the inflation end 46 and the restraint part 52 is folded (cf. also FIG. 19). In this example, the length of the neck 54 is approx. 5 to 40 cm, wherein those skilled in the art may easily adapt the exact length to the circumstances within the vehicle, e.g. the length of the passage and the position of the baffle of the airbag 16 in the inflated state.

In the transverse direction $Q_G$ of the airbag 16 normal to the longitudinal direction L thereof (cf. e.g. FIG. 19) and, resp., to the longitudinal module direction M, the neck 54 is definitely narrower than the restraint part 52. For example, the width of the neck 54 amounts to about 25-50% of the maximum width of the flatly spread restraint part 52. Thus, the filling volume of the neck 54 is definitely smaller than that of the restraint part 52.

The neck 54 in this embodiment does not contribute to the restraining effect as it acts high above in the vehicle directly on the roof liner. By decreasing the volume of the neck 54 by reducing its width, thus material, filling gas and space can be saved in the airbag module 12.

Figure 36:
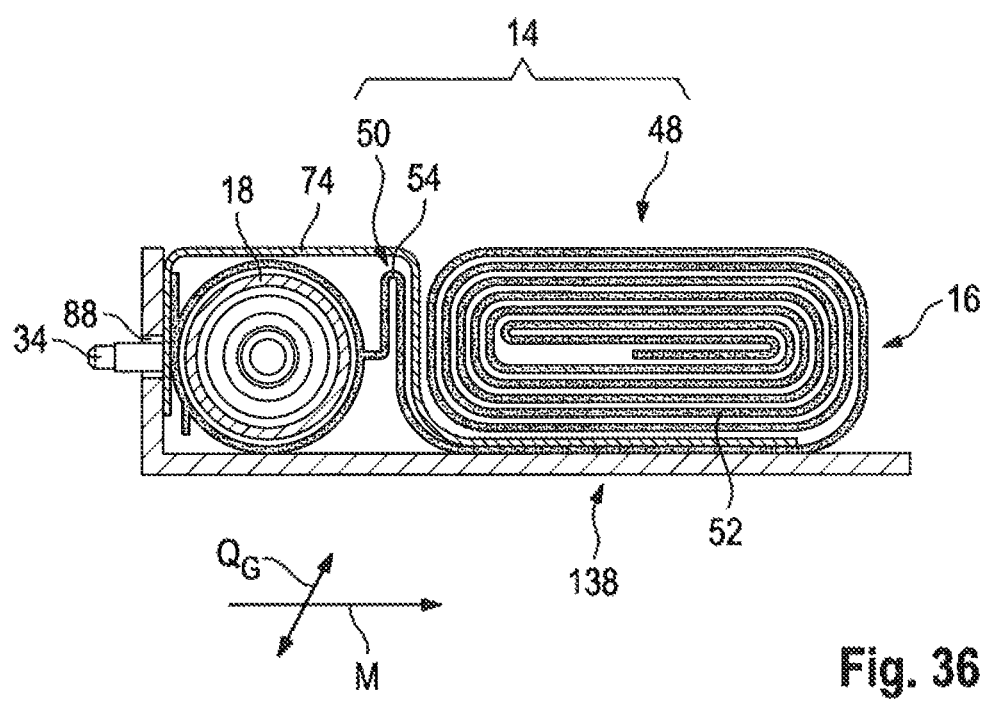
FIG. 36 shows the airbag package in a schematic sectional view being inserted in a folding device.

The connecting portion 50 and the main package 48 constitute two portions of the airbag package 14 folded separately from each other, as is evident from FIG. 36, for example.

Whereas the main package 48 is folded and rolled, for example, as will be illustrated later, the connecting portion 50 in this case is merely folded in a zigzag folding having one to three folds in this example. The folds are strung in series in the longitudinal module direction M in this case.

In the longitudinal module direction M, the inflator 18, the connecting portion 50 and the main package 48 are located linearly in series.

This arrangement causes filling gas to flow from the inflator 18 initially into the neck 54 folded in the connecting portion 50. Due to the mere zigzag folding, the folds are filling one by one, which results in the fact that the connecting portion 50 will stretch and thus will exert a force acting in the longitudinal module direction M on the still folded main package 48.

Figure 11:
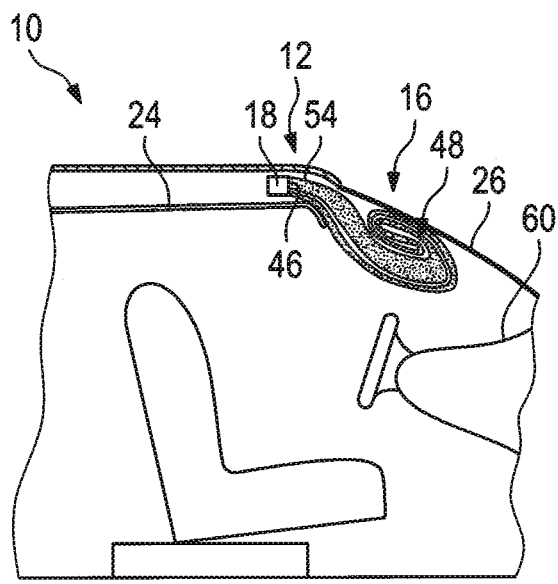
Figure 11:
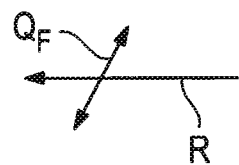
Figure 12:
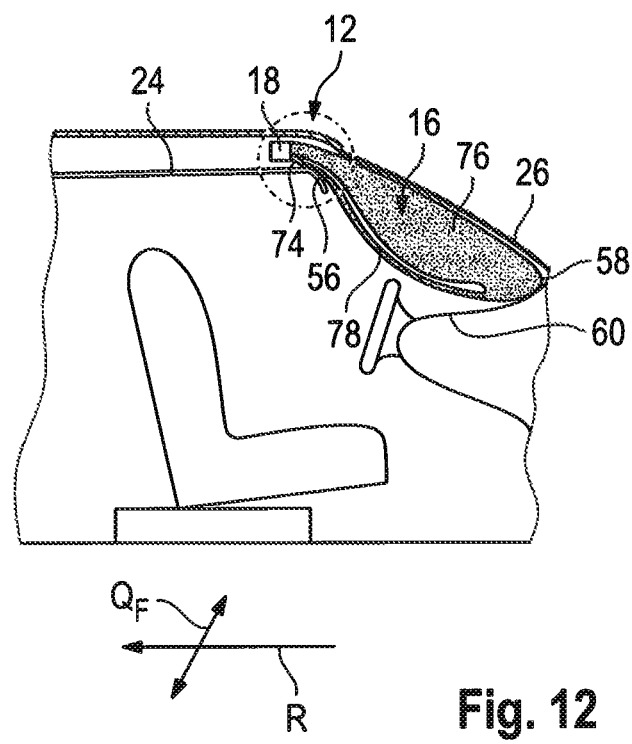
Figure 13:
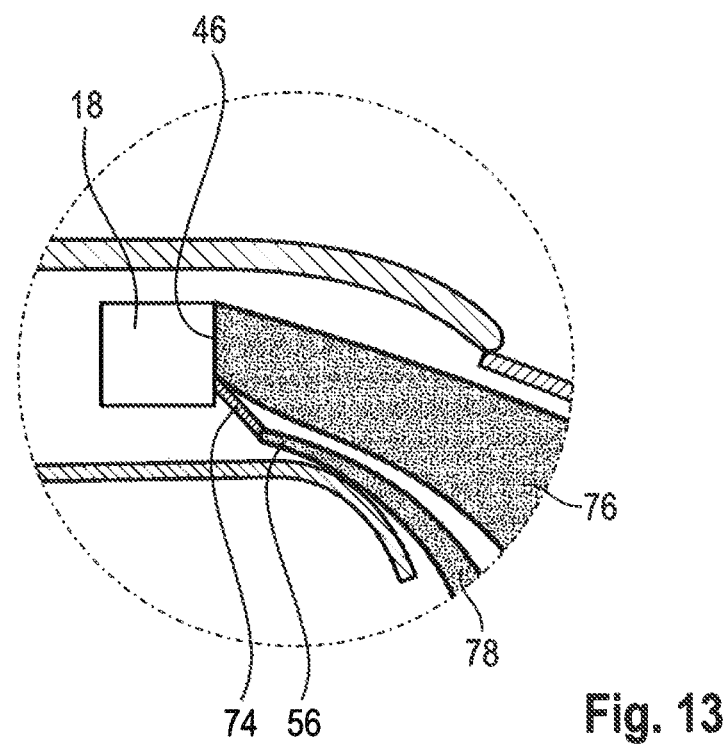

As a result, the main package 48 presses the roof liner 24 open and is slid into the vehicle interior while still being substantially folded. This situation is schematically shown in FIG. 11.

At this point in time, substantially no gas flows into the main package 48, as the gas flow is blocked by the still existing folds of the connecting portion 50.

Although here this folding technique and the sliding of the main package 48 out into the vehicle interior is described in connection with an airbag module 12 fastened to the roof, according to the invention this technique may be conferred upon airbag modules that are used at other locations within the vehicle, such as in the knee area or in a backrest.

In the side view, the completely inflated airbag 16 approximately takes a Y-shape or T-shape (see FIG. 17), with the stem of the Y or T being formed by the inflation end 46 and the neck 54. The restraint part 52 comprises a first free end 56 as well as a second free end 58. This is evident for the inflated airbag 16 in FIG. 17 and for the non-inflated flatly spread airbag 16 e.g. in FIG. 18 which illustrates the non-inflated airbag 16 in a lateral sectional view, wherein the usually flatly superimposed layers are shown to be somewhat pulled apart for reasons of clarity.

In the fully inflated state, the second free end 58 is located in a transition between the windshield 26 and an instrument panel 60 of the vehicle, while the first free end 56 extends in the direction of the vehicle occupant and forms a lower end of the total airbag 16 as well as of a baffle 62 for absorbing the vehicle occupant.

Figure 18:
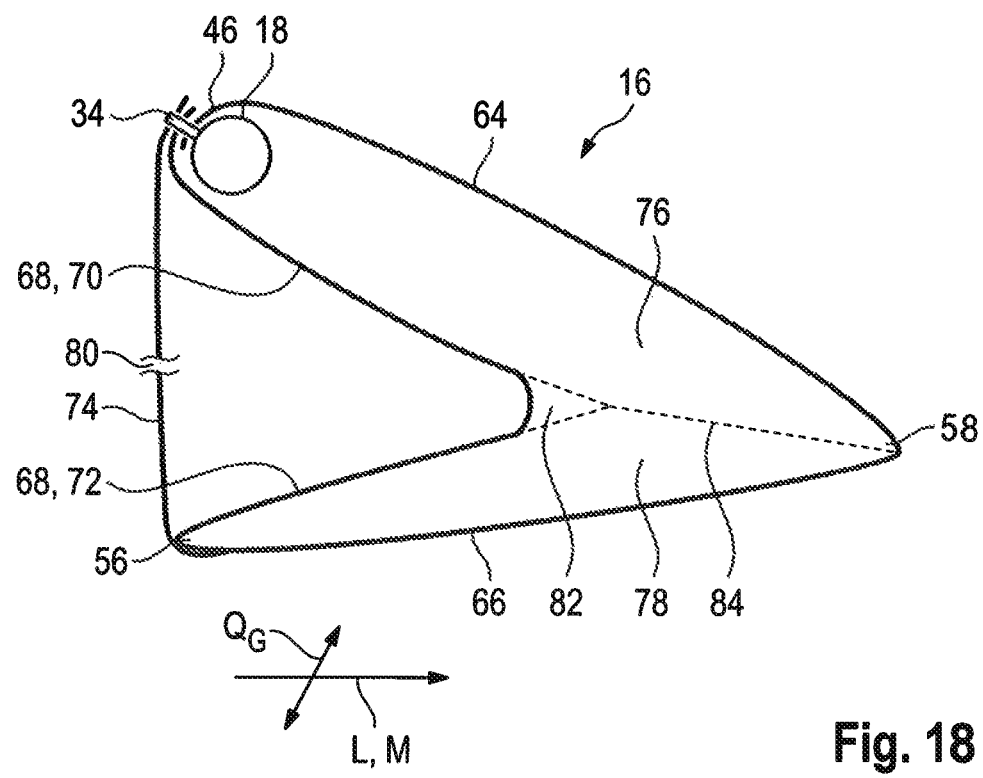
FIG. 18 shows a schematic sectional view of the airbag of the vehicle occupant restraint system of FIG. 1 with the inflator being inserted.

The airbag 16 substantially includes three large outer wall portions 64, 66, 68 (see FIG. 18). A first outer wall portion 64 extends from the inflation end 46 to the second free end 58 and in the inflated state forms a bearing surface for the airbag 16 on the windshield 26. A second outer wall portion 66 extends from the second free end 58 to the first free end 56 and in the inflated state is located above the instrument panel 60. A third outer wall portion 68 extends from the first free end 56 to the inflation end 46 and in the inflated state of the airbag 16 forms the baffle 62 for the vehicle occupant.

In the third outer wall portion 68 the neck 54 is transformed into the restraint part 52 via a shoulder 69 which is beveled on both sides so that a continuous transition is formed from the neck 54 into the baffle 62 (cf. FIG. 19).

In the folded main package 48, however, the first free end 56 is folded back toward the inflation end 46 so that portions 70, 72 of the third outer wall portion 68 are folded back onto themselves. Accordingly, initially the free end 56 is connected to the inflation end 46 by a tether 74. This is shown in detail in FIGS. 12, 13 and 18.

The tether 74 in this example is not fixed directly to the first free end 56 but offset by about 5 to 20 cm on the second outer wall portion 66. This permits a more compact folding of the airbag package 14, as will be described below.

This fact as well as the folding of the main package 48 described later in detail ensure that at the time when the main package 48 arrives in the vehicle interior the first free end 56 is still withheld by the tether 74 in the roof area. The remainder of the main package 48 meanwhile further deploys in the vehicle interior, wherein the filling gas flowing into the airbag 16 at first inflates only a partial area of the airbag 16.

Figure 14:
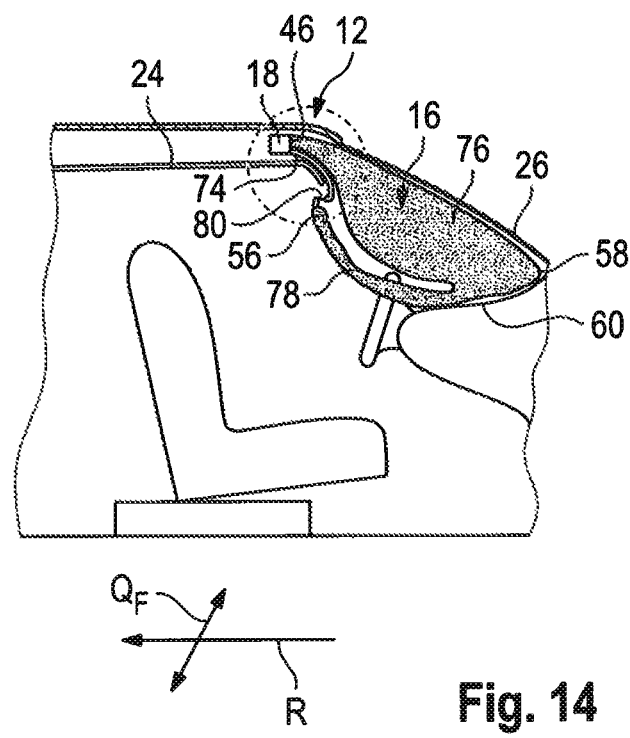
Figure 15:
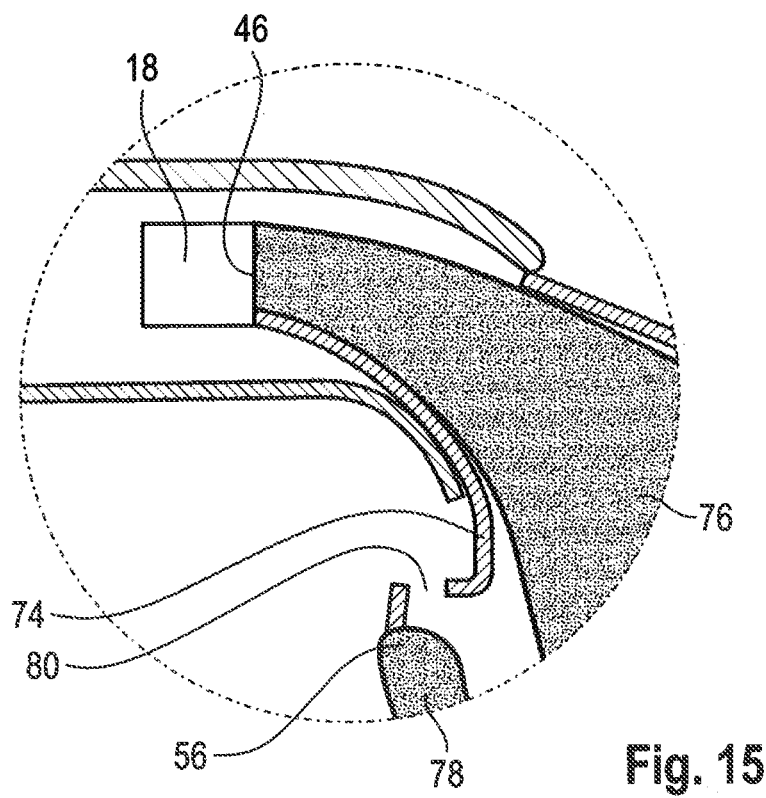

It is evident from FIGS. 14 and 18 that at this time when the first free end 56 is still connected to the inflation end 46 via the tether 74, the airbag 16 takes approximately a U-shape having an inner leg 76 and an outer leg 78.

The inner leg 76 of the U is delimited toward the windshield 26 by the first outer wall portion 64 of the airbag 16. Toward the passenger compartment, the inner leg 76 is delimited by an upper portion 70 of the third outer wall portion 68.

The outer leg 78 is delimited toward the instrument panel 60 by the second outer wall portion 66. Toward the vehicle interior, the outer leg 78 is delimited by a lower portion 72 of the third outer wall portion 68.

The two portions 70, 72 of the third outer wall portion 68 are initially held together by the tether 74. In this way, filling gas flows only into the inner leg 76, while the outer leg 78 still remains substantially unfilled, although the airbag package 14 already has largely deployed. This situation is illustrated in FIGS. 12 to 15.

When a particular tensile force which is accompanied by a predetermined filling volume of the airbag 16 is exceeded, the tether 74 becomes detached after a first period of time following activation of the inflator 18. In this example, for this purpose a weakened zone 80 is formed on the surface of the tether 74 (see FIG. 18).

Figure 16:
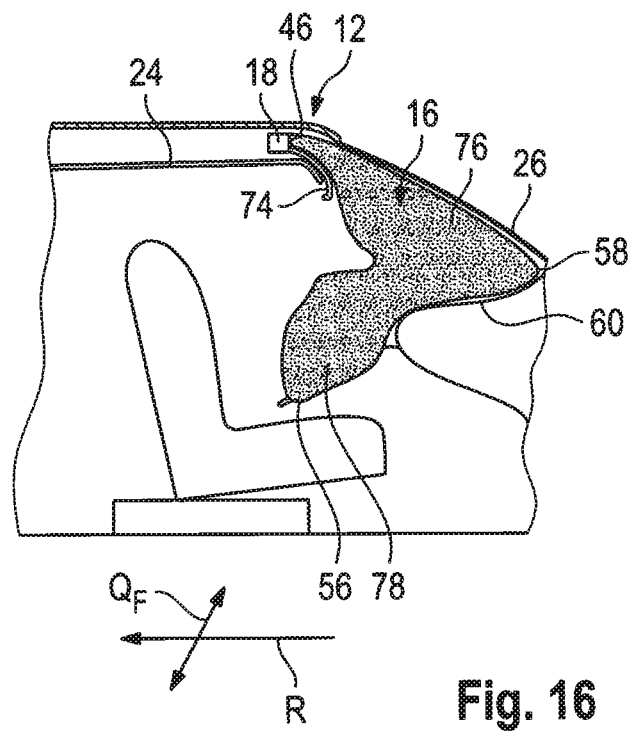

At the time when the tether 74 becomes detached, the neck 54 is already fully inflated in this example (see FIG. 16).

Figure 17:
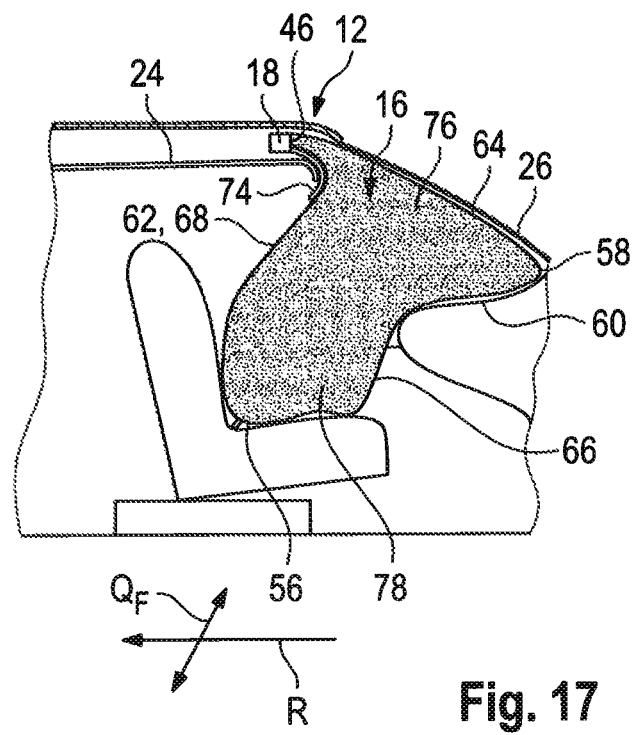

In a second period following the first period, the airbag 16 is completely filled after the tether 74 has split in two parts at the weakened zone 80. The completely inflated state is shown in FIG. 17.

In the fully inflated state, the airbag 16 takes approximately a Y-shape or a T-shape, when viewed from the side, as the inner leg 78 has folded downwards in the vehicle interior. The arms of the Y then are formed by two inflated portions of the restraint part 52 each of which extend from the first and second free ends 56, 58 toward the inflation end 46 and both of which merge into the neck 54.

Moreover, in the third outer wall portion 68 a bag 82 inwardly reversed in the folded state (see FIG. 18) is formed which in the fully inflated airbag 16 bulges partly outwardly and thus enlarges the baffle 62. A lower end of the bag 82 is permanently connected to the second free end 58 via an inner tether 84, however, so as to stabilize the shape of the inflated airbag 16.

Preferably, before the airbag 16 is folded, the inflator 18 is fixed at the inflation end 46 within the airbag 16, as is shown in FIGS. 20 to 23. This step might also be taken after folding the airbag 16, however.

At the inflation end 46 the airbag 16 ends in two opposite tabs 86 each of which extends over the entire width of the neck 54. Each of the tabs 86 includes two fastening holes 88 as well as a positioning hole 90 corresponding, as to their arrangement, to the fastening bolts 34 and the positioning bolt 42 at the inflator 18 (see e.g. FIG. 20).

Inside the airbag 16 each of the two tabs 86 may be reinforced by one or more reinforcing layers which also may include a temperature-resistant and gastight coating, where necessary.

Figure 22:
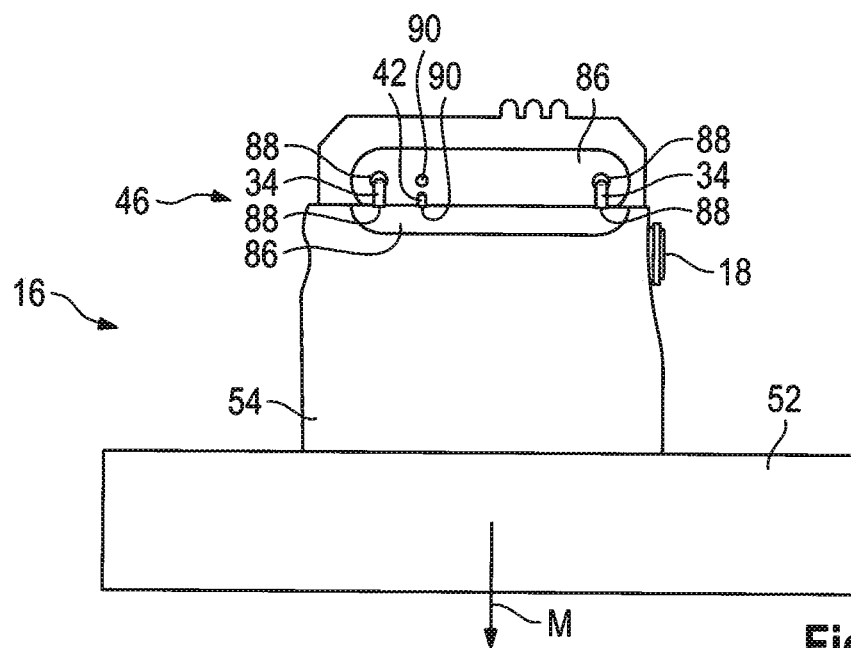
Figure 23:
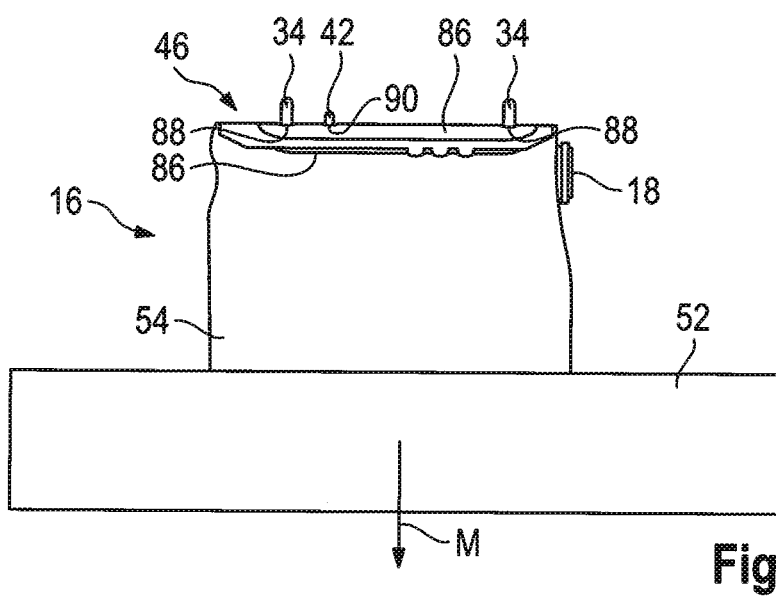

For assembly of the inflator 18, the latter is placed between the two tabs 86 (FIG. 21) and then the two tabs 86 are individually folded over the inflator 18, with each fastening hole 88 being pulled over the fastening bolts 34 and the positioning hole 90 being pulled over the positioning bolt 42 (FIGS. 22 and 23).

Due to the wrapping by the two tabs 86 and possibly the coating provided on the inside of the tabs 86, the inflator-side inflation end 46 of the airbag 16 now is sealed in a sufficiently gastight manner.

The tabs 86 now are secured to the fastening bolts 34 by means of clamping washers and/or screw nuts (not shown).

Figure 24:
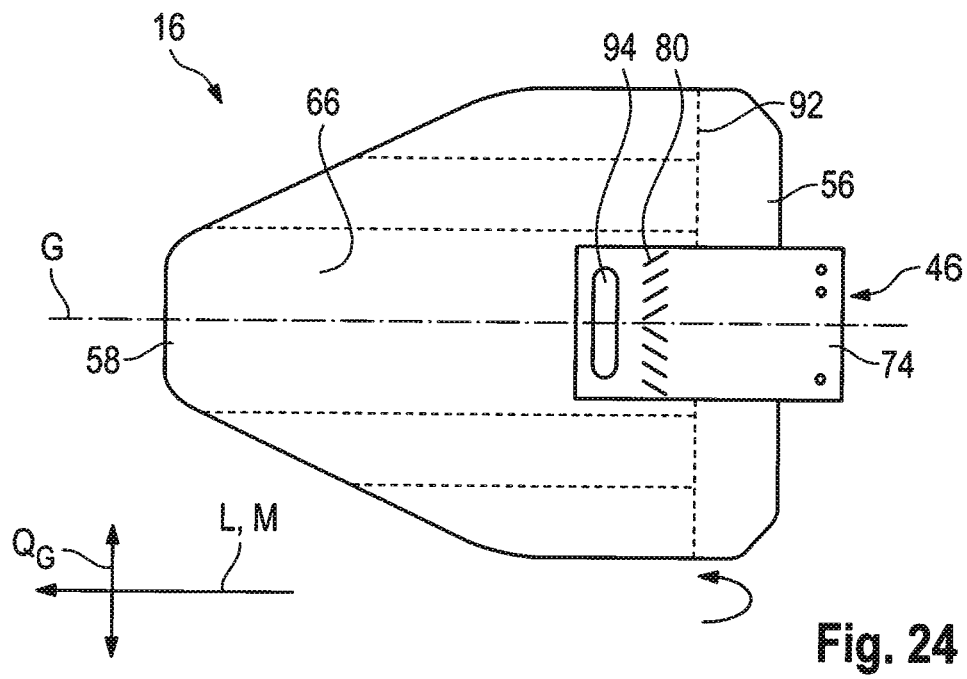
FIGS. 24 to 27 show steps of folding the airbag of the vehicle occupant restraint system of FIG. 1 when viewed in a top view.

For folding the airbag 16 into the airbag package 14, the airbag 16 at first is flatly spread as shown in FIG. 24, with the first end 56 being folded back to the inflation end 46.

Thus, in the area of the first free end 56 the two legs 76, 78 of the airbag 16 are superimposed. The third outer wall portion 68 is folded back onto itself in the portions 70, 72.

Each of the first outer wall portion 64 and the second outer wall portion 66, on the other hand, extends stretched from the second free end 58 to the inflation end 46.

The tether 74 is positioned so that its free end is located on the inflation end 46.

Figure 25:
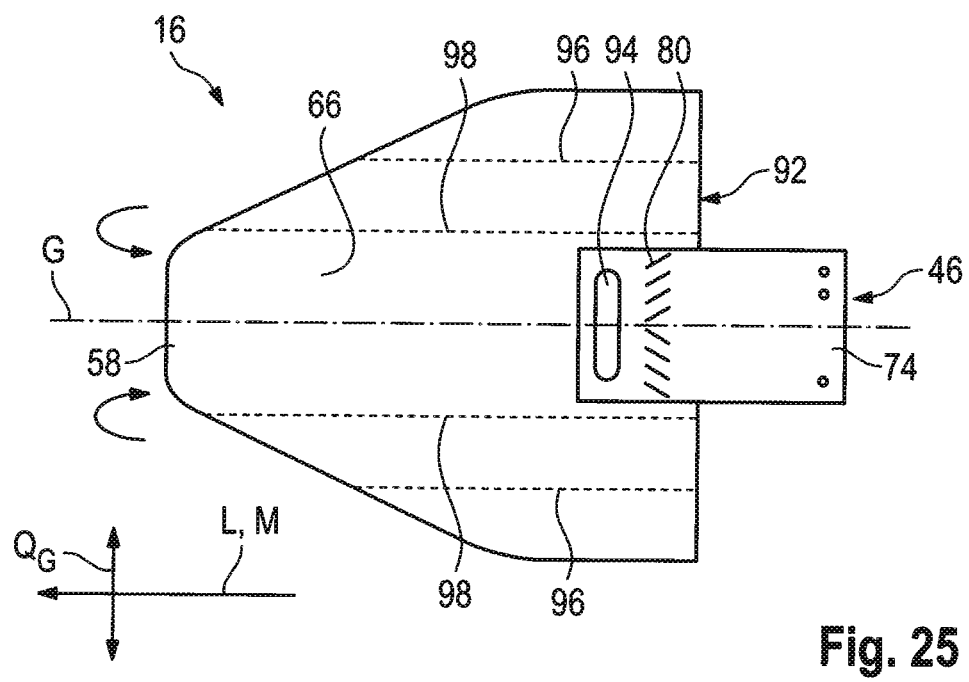

In a first folding step, the first free end 56 now is folded once about a folding line 92 located perpendicularly to the longitudinal airbag direction L (which in the flatly spread airbag 16 coincides with the longitudinal module direction M) but not over an attachment point 94 of the tether 74 on the second outer wall portion 66 (see FIGS. 24 and 25). Depending on the shape of the airbag, this folding step might be omitted as well.

Figure 26:
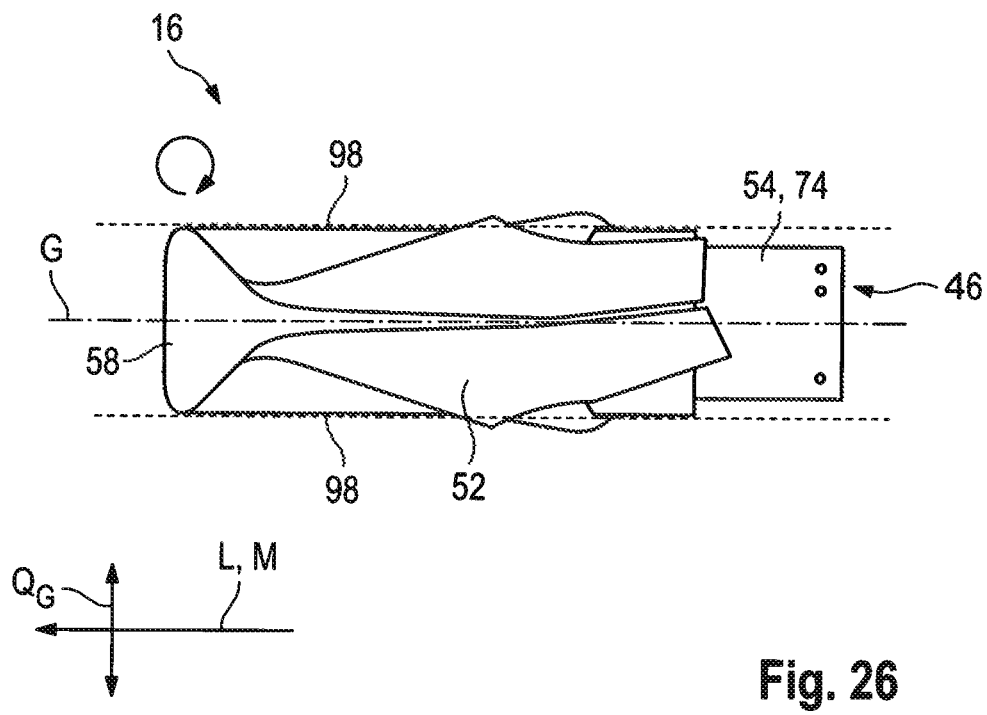

Now in a second folding step, the two lateral areas of the airbag 16 are folded inwardly in a zigzag fold along folding lines 96, 98 extending in parallel to the longitudinal airbag direction L. This is shown in FIGS. 25 and 26. The two folding lines 98 now delimit the airbag 16 laterally outwardly in the transverse direction $Q_G$.

The distance of the folding lines 96, 98 from each other and from a peripheral edge of the airbag 16 is selected so that in the center of the airbag no overlapping of the lateral areas of the airbag 16 will occur, wherein the center of the airbag 16 is defined by an imaginary center line G extending from the inflation end 46 to the second free end 58 and being arranged symmetrically to the inflation end 46.

In the spread state, the airbag 16 can be symmetrical with respect to said center line G, however this is not imperative but is determined, inter alia, by the geometry of the passenger compartment, the windshield 26 and the instrument panel 60.

Figure 27:
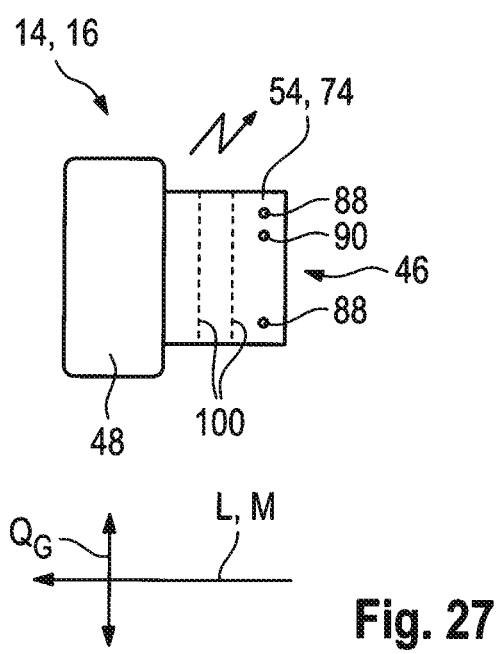

The partially folded airbag 16 shown in FIG. 26 now is rolled up in a rolling step starting from the second free end 58, for example in three to ten turns, especially in six turns, toward the inflation end 46. The result of this folding step is illustrated in FIG. 27. The rolled-up area now forms the main package 48. The airbag 16 is rolled up only to the end of the restraint part 52 of the airbag 16. The areas of the neck 54 and of the tether 74 projecting therefrom in the direction of the inflation end 46 (see FIGS. 26 and 27) remain unaffected by this folding step.

In another folding step, the area of the neck 54 as well as possibly of the tether 74 projecting from the main package 48 is folded into a mere zigzag folding having about one to three folds, with the folding lines 100 being aligned perpendicularly to the module direction M and thus in parallel to a longitudinal axis of the inflator 18 (not shown here). Now the folded airbag package 14 takes the shape shown in FIGS. 27 and 36.

The same hole structure 88, 90 as at the tabs 86 of the airbag 16 is realized also at the free end of the tether 74, and the tether 74, too, is pulled over the fastening bolts 34 and the positioning bolt 42 with the fastening holes 88 and the positioning hole 90 (see also FIG. 36). The two tabs 86 and the tether 74 now are superimposed in three layers, with the fastening bolts 34 of the inflator 18 passing through all three aligned fastening holes 88. This applies mutatis mutandis to positioning holes 90.

In the mounted state, the airbag 16 is connected to the module carrier 22 in a load-bearing manner via the fastening bolts 34. The tensile forces acting on the tether 74 are also transmitted to the module carrier 22 via the fastening bolts 34.

Figure 28:
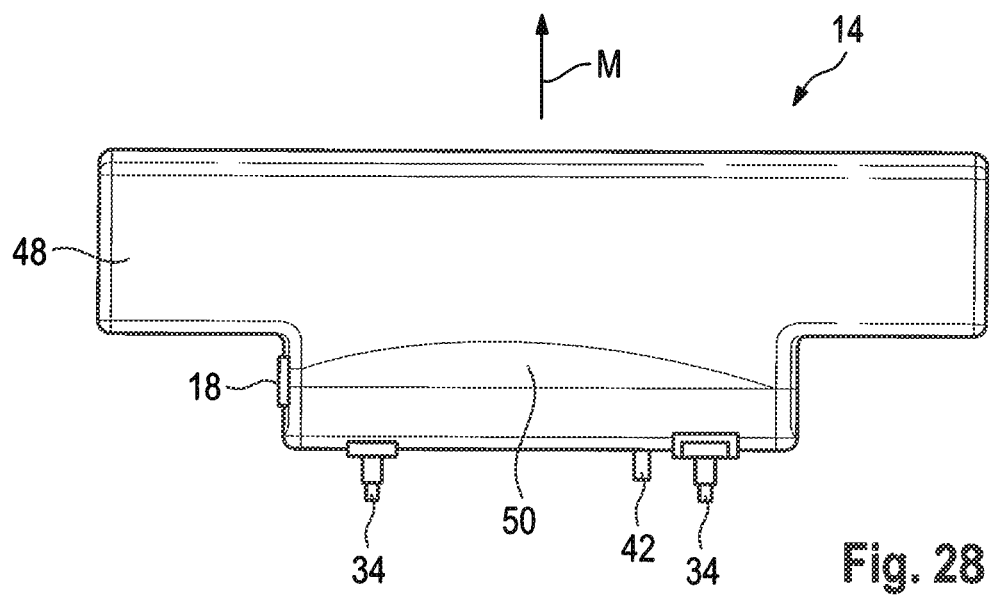
FIG. 28 shows a schematic representation of the folded airbag package of the vehicle occupant restraint system of FIG. 1.

After inserting the inflator 18 and folding the airbag 16, the airbag package 14 takes the shape as shown in FIG. 28.

After having fixed the inflator 18 in the airbag 16 and having folded the airbag 16 into the airbag package 14, the airbag package 14 is inserted along with the inflator 18 into the wrapping 20.

The FIGS. 29 to 35 illustrate the wrapping 20 in detail.

Figure 30:
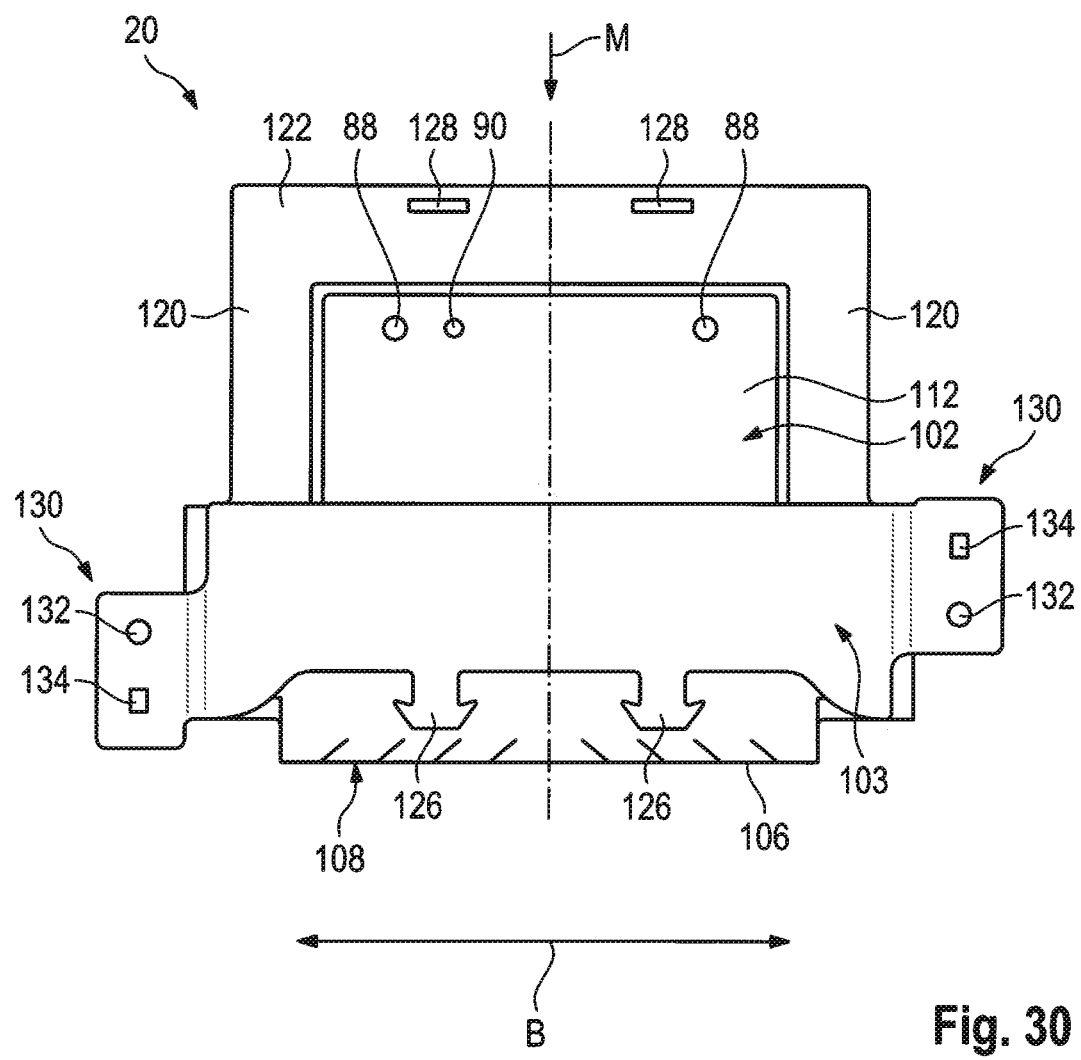
FIG. 30 shows a schematic top view onto the wrapping of FIG. 29.

In this example, the wrapping 20 consists completely (except for possible seams, of course) of airbag fabric and is composed of exactly two cut parts 102, 103 (see FIG. 30).

The wrapping 20 includes a holding bag 104 (see FIG. 31) that is formed by two folded portions of the first cut part 102 and serves for holding the main package 48 of the airbag package 14. A bottom 106 of the holding bag 104 is provided with a weakened zone 108 (see FIG. 30, for example) and extends in a direction B normal to the module direction M.

Each of the two edges 110 (cf. FIG. 31) of the holding bag 104 facing away from the bottom 106 in one piece and seamlessly merges into a retaining tab 112. The two retaining tabs 112 form an inflator fixation 114 for fixing the inflator 18 in the wrapping 20 and at each of their free ends include a hole pattern corresponding to the arrangement of the fastening bolts 34 and the positioning bolt 42. Accordingly, at the free edge of each retaining tab 112 two fastening holes 88 as well as one positioning hole 90 are provided.

The holding bag 104 and the retaining tabs 112 are jointly realized in the first cut part 102 by the first cut part 102 being folded back onto itself and the longitudinal edges adjacent to the folding line being connected in portions so as to form the holding bag 104. The free portions exceeding the holding bag 104 then form the retaining tabs 112 (cf. e.g. FIGS. 30 and 31).

Figure 31:
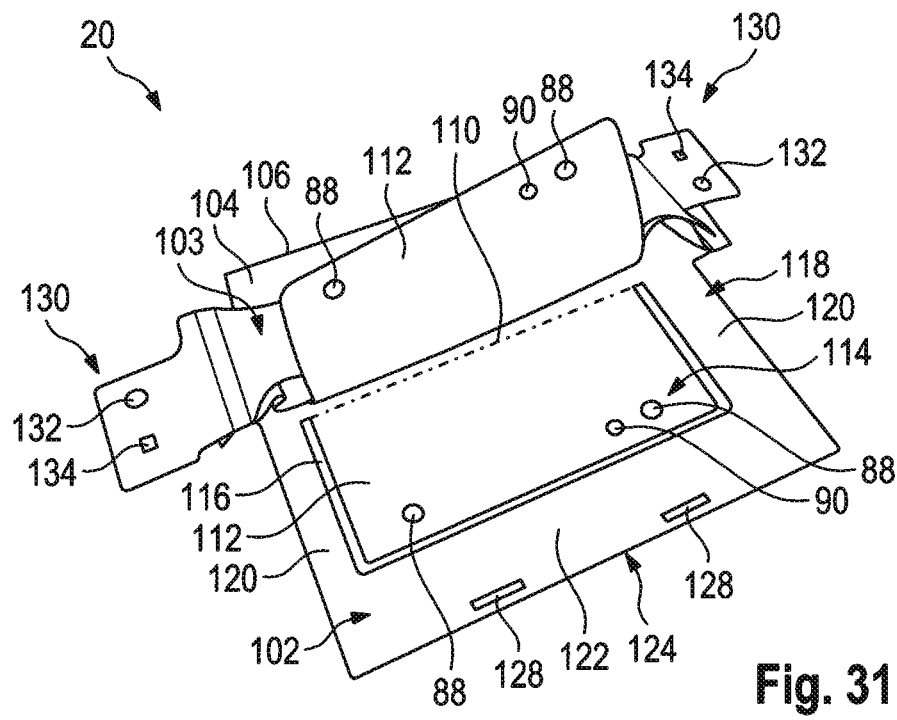
FIG. 31 shows a schematic perspective representation of the wrapping.

One of the retaining tabs 112, in FIG. 31 the flatly spread lower retaining tab 112, is disconnected by a U-shaped intersecting line 116 from a surrounding remainder of the first cut part 102. The intersecting line 116 forms a bracket 118 having two belt portions 120 located on the side of the retaining tab 112 as well as a web 122 connecting the two belt portions 120. The belt portions 120 merge into the holding bag 104 in one piece at their end opposite to the web 122.

The bracket 118 is part of an airbag package fixation 124. In addition, the latter includes at least one pair of first and second fixing elements 126, 128 adapted to be nested and thus to be fixed to each other. In this case, two pairs of fixing elements 126, 128 are provided which are juxtaposed in parallel to the direction B of the bottom 106. The exact position and number of fixing elements as well as the formation thereof are at a skilled person's discretion, of course.

In this example, the first fixing elements 126 are formed at the second cut part 103 extending in parallel to the direction of the bottom B over the holding bag 104. The first fixing elements 126 in this example take the shape of arrow-type hooks (cf. especially FIGS. 30 and 35) which are formed at an edge of the second cut part 103 facing the bottom 106.

Figure 35:
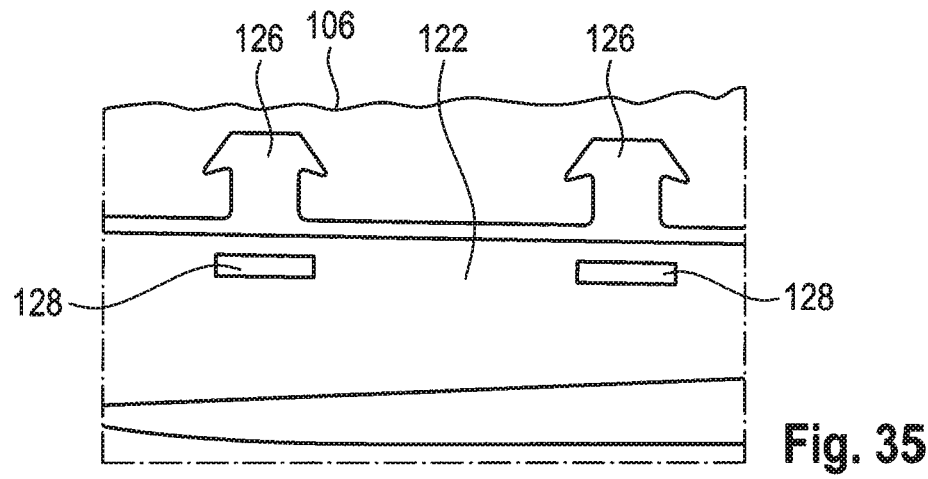
FIG. 35 shows details of the airbag package fixation of the wrapping.

Each of the two second fixing elements 128 is configured in the web 122 and here is formed by a respective elongate opening through which the hook of the first fixing element 126 can be inserted so that the hook edges engage behind the edge of the opening and fix the first fixing element 126 to the web 122. FIG. 35 shows a detailed view of the fixing elements 126, 128.

The second cut part 103 in this embodiment is made from multi-layer airbag fabric, whereas the first cut part 102 is cut out of a single-layer airbag fabric. Cutting is implemented by laser-cutting in this case, thus causing in the second cut part 103 the edges of the plural layers to be welded directly to each other without any further fixation of the edges to each other being required. Since, in this way, also the first fixing elements 126 are made from multi-layer airbag fabric, they have sufficient stiffness so as to get caught in the openings of the second fixing elements 128.

The second cut part 103 extends beyond the holding bag 104 laterally, viz. in parallel to the bottom direction B. At each of its free ends, a fixing portion 130 which serves for fastening the wrapping 20 tightly to the vehicle is formed. Said fastening need not bear the complete load of the deploying airbag 16, but primarily serves for positioning the airbag module 12 on the roof rail 23.

However, here the fixing portions 130 are also used for prefixing the airbag module 10 in the vehicle. For this purpose, each of the fixing portions 130 includes, apart from a fastening hole 132 through which e.g. a screw for vehicle-tight fastening is inserted, a further prefixing hole 134 in which a fastening clip 136 is inserted (see FIG. 34). When assembling the airbag module 10 to the vehicle, the fastening clip 136 is pushed into an opening on the roof rail 23 or on the module carrier 22 and maintains the airbag module 10 in position until the final fastening is completed.

The fastening hole 132 and the prefixing hole 134 are arranged in the two fixing portions 130 each in parallel to the longitudinal module direction M on top of each other but in a different order (see e.g. FIG. 30).

Figure 32:
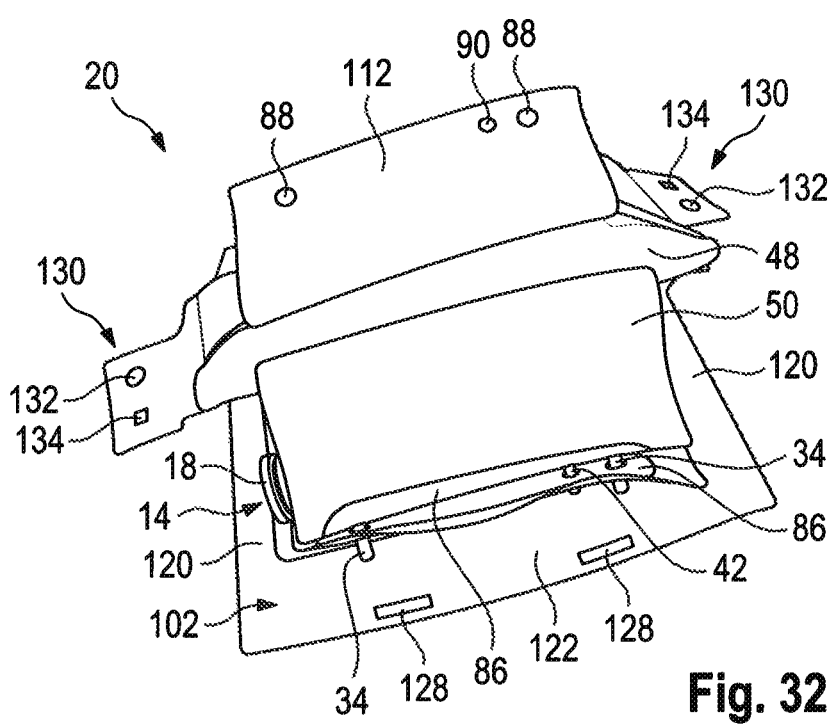
FIGS. 32 to 34 show the insertion of the airbag package into the wrapping.
Figure 33:
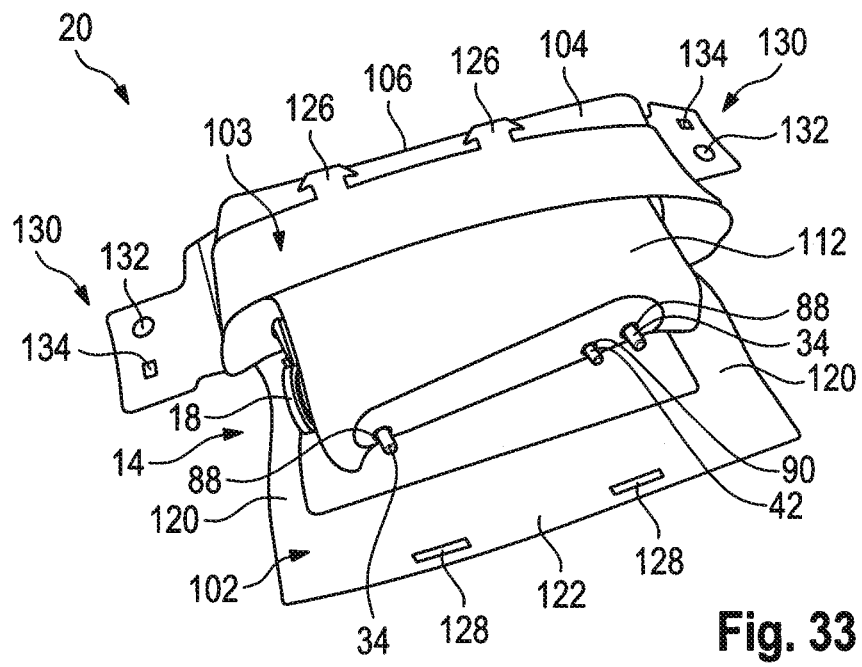
Figure 34:
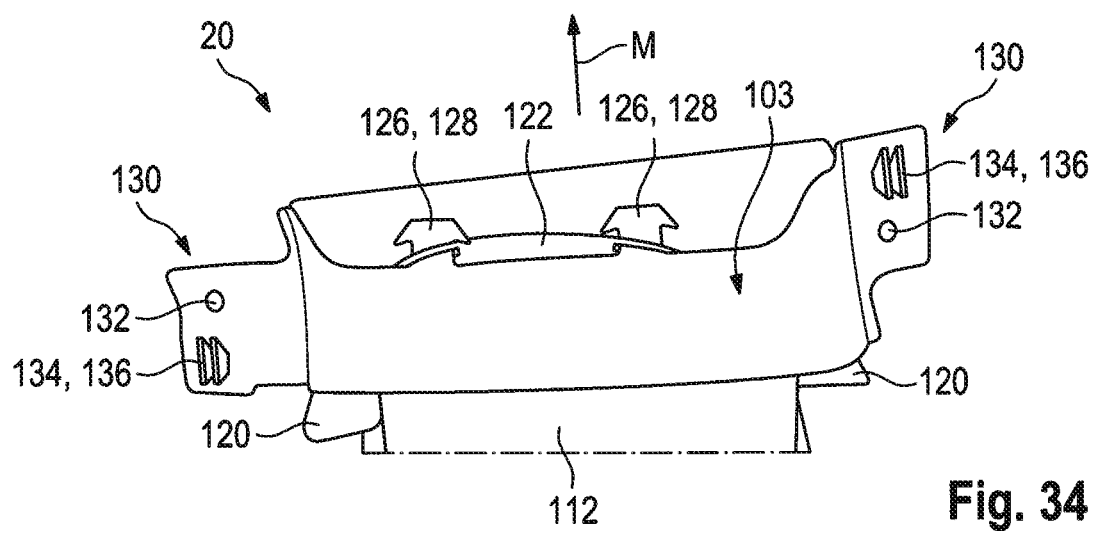

For inserting the airbag package 14 into the wrapping 20, initially the main package 48 is inserted into the holding bag 104 (see FIGS. 31 and 32). Then the two retaining tabs 112 are successively pulled with the fastening holes 88 and the positioning holes 90 over the fastening bolts 34 and the positioning bolt 42 of the inflator 18 so that they encompass the inflator 18 as well as naturally the inflation end 46 of the airbag 16 on the rear side of the inflator 18 (cf. FIGS. 32 and 33 as well as 37 and 38).

Figure 37:
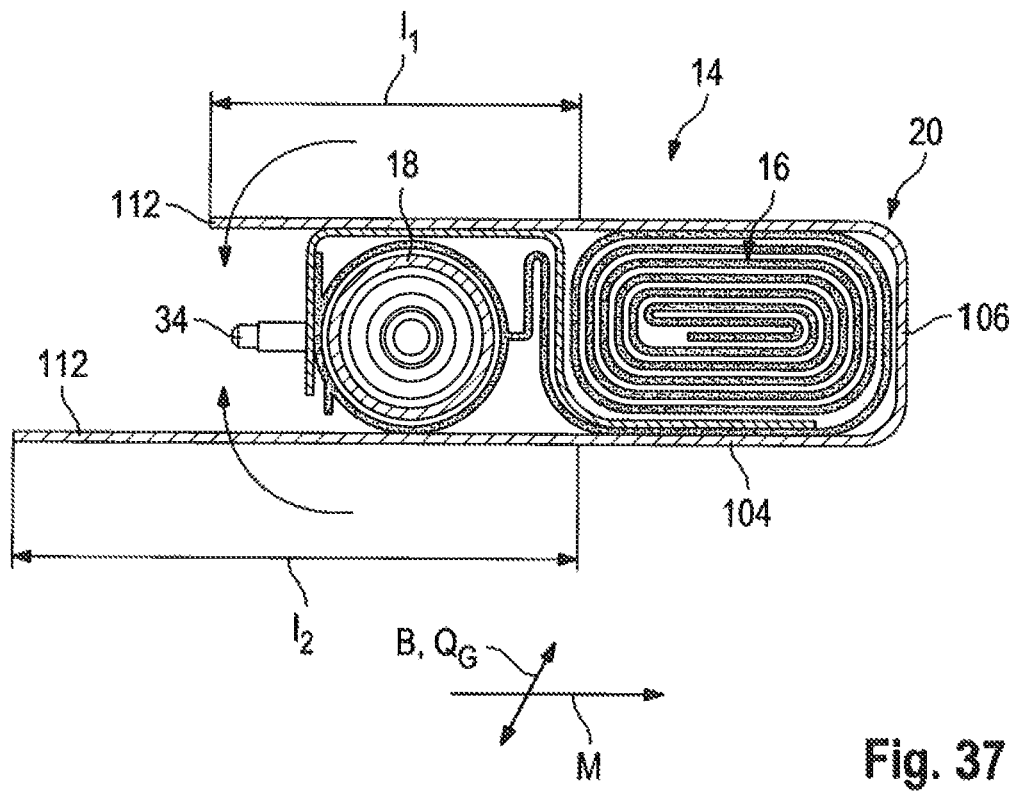
FIGS. 37 and 38 show the closing of an inflator fixation of the wrapping.
Figure 38:
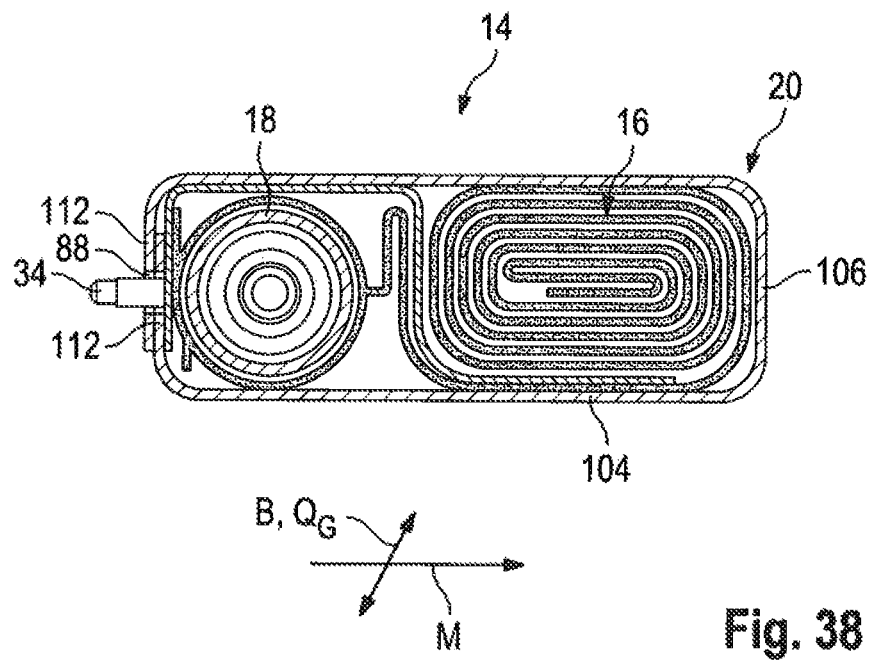

In the longitudinal module direction M, the two retaining tabs 112 may have different lengths $I_1$, $I_2$ as shown in FIG. 37, for example. In this way, the tensile forces acting via the retaining tabs 112 upon the fastening bolts 34 of the inflator 18 can be adjusted to a certain degree. As a result, the alignment of the inflator 18 with respect to rotation about the longitudinal axis thereof can be determined by selecting the length of the retaining tabs 112. Usually the fastening bolts 34 are desired to extend exactly in the longitudinal module direction M. However, it might also be advantageous, for example for facilitating the assembly on the roof rail, when the bolts 34 are tilted by few degrees vis-à-vis the longitudinal module direction M. Since the inflator 18 usually includes a flat gas outlet area (not shown), tilting by few degrees will not affect the gas outflow and the inflation behavior of the airbag 16.

Since the inflator fixation 114 is closed as described (shown in FIG. 33), now the bracket 118 is pulled over the retaining tabs 112. In the next step, the web 122 is slid through below the second cut part 103 and the hooks of the first fixing elements 126 are inserted through the openings of the second fixing elements 128 (see FIG. 34). The belt portions 120 are now located on the side of the retaining tabs 122 above the main package 48 of the airbag package 14 and safely retain the latter within the holding bag 104. Thus, the airbag package fixation 124 is closed.

The airbag package 14 including the wrapping 20 now can be inserted in the module carrier 22 so as to assemble the airbag module 10 to the vehicle.

When activating the airbag module 10, the weakened zone 108 opens at the bottom 106 of the holding bag 104 so as to let the airbag package 14 move out. The inflator fixation 114, the airbag package fixation 124 as well as the vehicle-tight fixation via the fixing portions 130 remain closed.

In order to better fix the zigzag folding of the neck 54 in the connecting portion 50 while the airbag package 14 is inserted into the wrapping 20, in an alternative process an intermediate cover 140 may be used, as illustrated in FIGS. 39 to 44.

Figure 39:
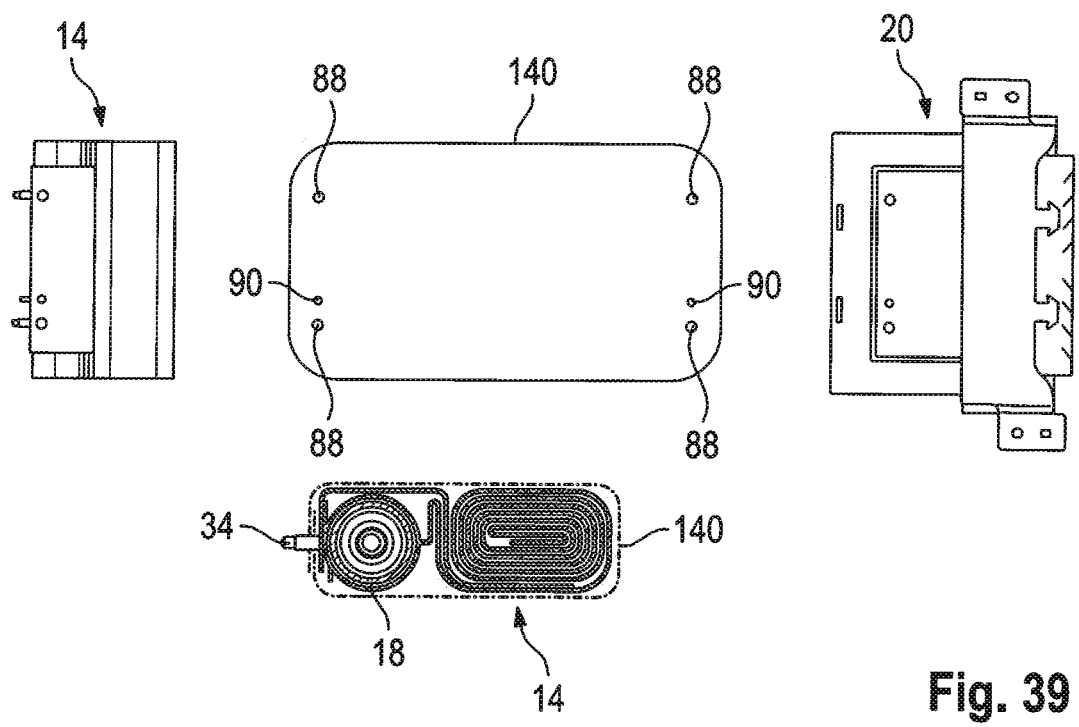
FIG. 39 shows a schematic overview of an alternative process for inserting the airbag package into the wrapping.

The intermediate cover 140 is a substantially rectangular piece of airbag fabric which at both free ends includes a hole pattern corresponding to the fastening bolts 34 and the positioning bolt 42 of the inflator 18 and having two fastening holes 88 and one positioning hole 90 (cf. FIG. 39).

Figure 40:
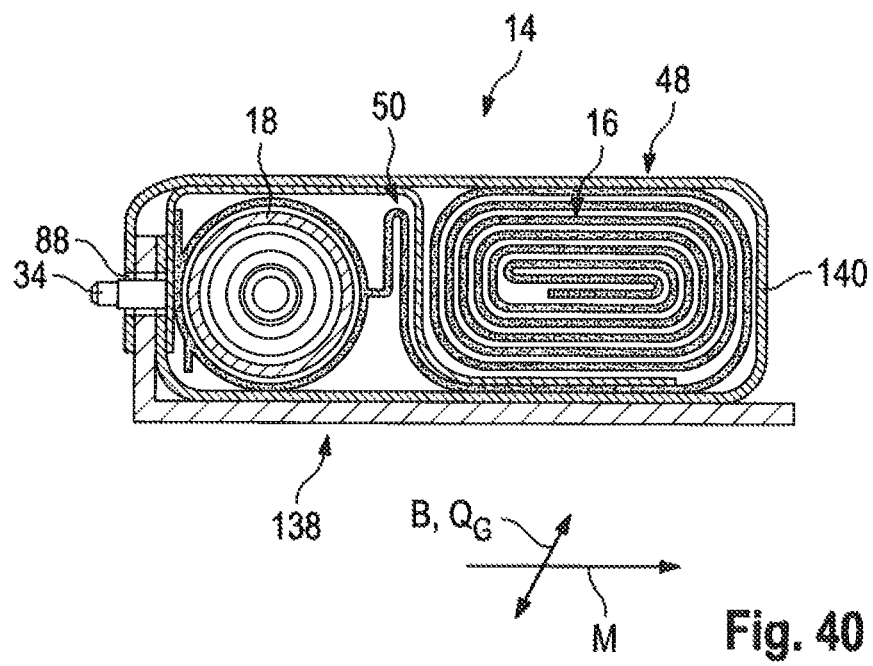
FIGS. 40 to 44 show steps of the alternative process for inserting the airbag package into the wrapping in a schematic representation.

The completely folded airbag package 14 including the inflator 18 is first wrapped into the intermediate cover 140, with both ends of the intermediate cover 140 being pulled over the bolts 34, 42 of the inflator 18. This is shown in FIG. 40, wherein use has been made of a known folding device 136.

Figure 41:
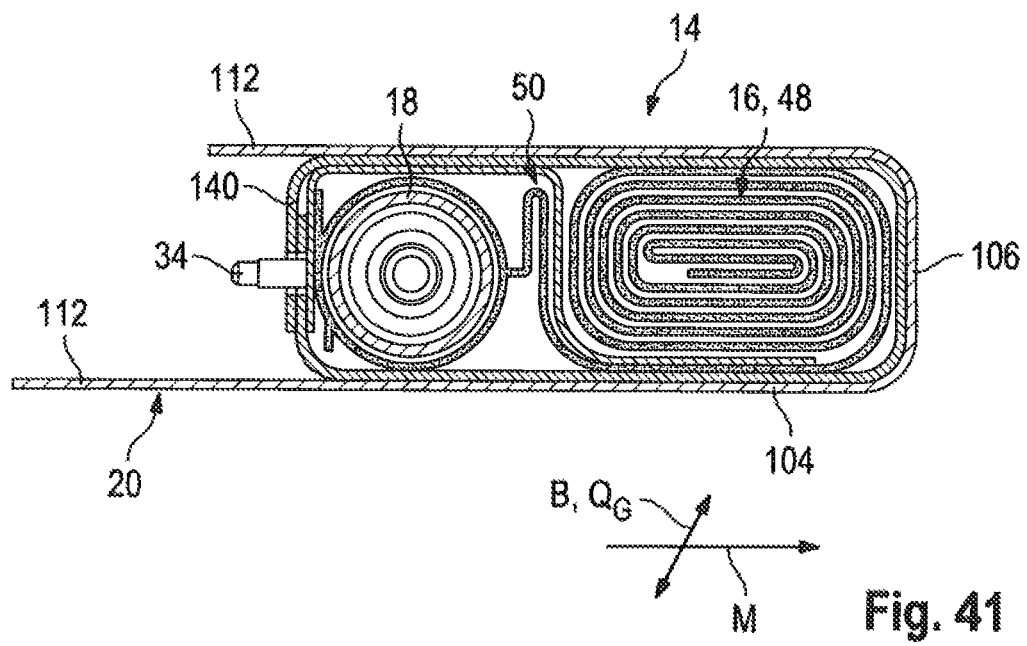

The airbag package 14 tightly enclosed by the intermediate cover 140 now is inserted into the wrapping 20, with the main package 48 being slid into the holding bag 104 (see FIG. 41).

Figure 42:
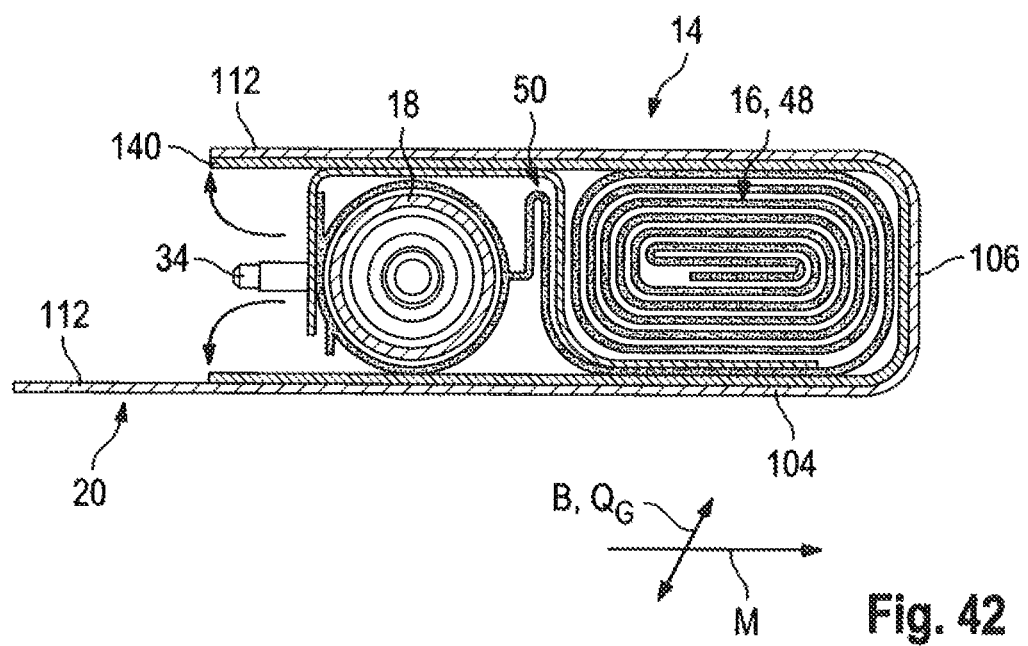

Now the intermediate cover 140 is opened again by the two ends thereof being removed from the bolts 34, 42 of the inflator 18. This is shown in FIG. 42.

Figure 43:
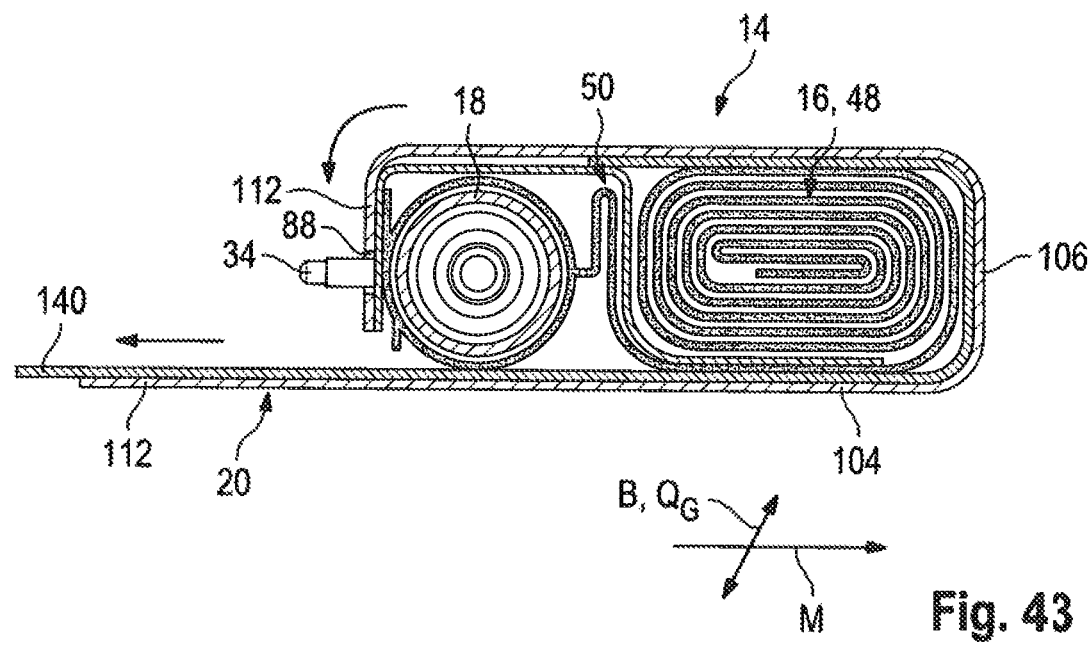
Figure 44:
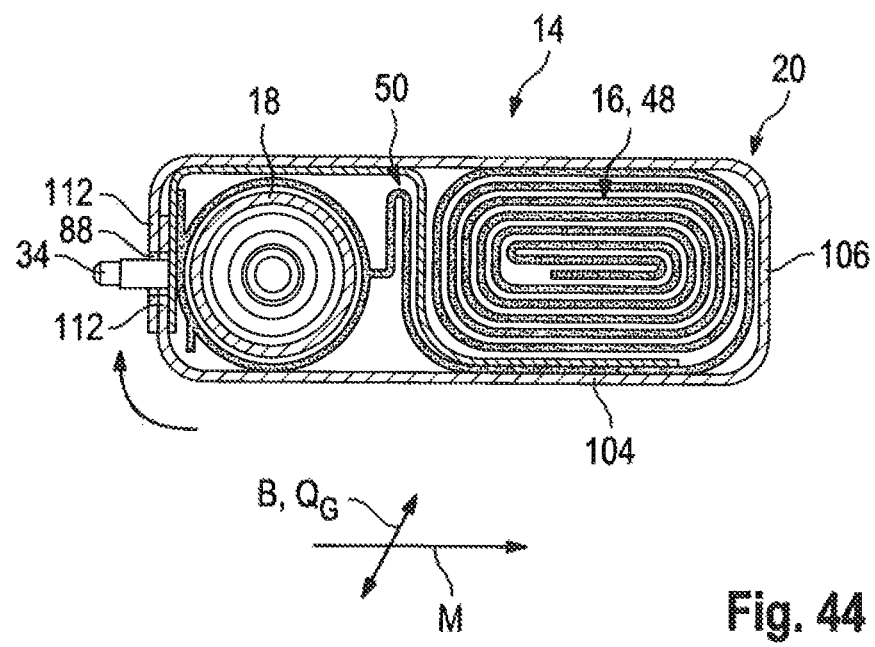

Either of the two retaining tabs 112 of the wrapping 20 is pulled over the bolts 34, 42 of the inflator 18 so as to fix the wrapping 20 to the inflator 18. Now the intermediate cover 140 can be removed from between the airbag package 14 and the wrapping 20, as illustrated in FIG. 43. In so doing, the folding especially of the connecting portion 50 cannot change any more, as the one retaining tab 112 already connected to the inflator 18 maintains the airbag package 14 in its desired shape.

After removing the intermediate cover 140 also the second retaining tab 112 is closed by the holes thereof being pulled over the bolts 34, 42 of the inflator 18.

Finally, the airbag package fixation 124 is closed by pulling the bracket 118 over the inflator 18 and the retaining tabs 112 surrounding the same, by sliding the web 122 beneath the second cut part 103 and by closing the fixing elements 126, 128, as described above.

The invention claimed is:

1. A vehicle occupant restraint system comprising an airbag module mounted to a vehicle roof beneath a roof liner of a vehicle, the airbag module including an inflator and a frontally acting airbag, wherein the airbag includes an inflator-side inflation end as well as a restraint part comprising a first free end connected to the airbag module via a tether, with the restraint part being folded to delimit an inner leg and an outer leg, the fold being maintained by the tether, wherein during a first period of deployment of the airbag, the first free end is still connected to the airbag module via the tether in the area of the inflation end, which causes the outer leg to deploy forward and downward from the roof liner first along a vehicle windshield and occupy the space between the vehicle roof and an instrument panel of the vehicle, and wherein after the outer leg is deployed and substantially inflated, and upon reaching a predetermined tensile force the tether becomes detached and releases the first free end, which allows the restraint part to unfold so that the inner leg deploys rearward and downward along an occupant facing surface of the instrument panel.

2. The vehicle occupant restraint system according to claim 1, wherein at the inflation end the airbag includes a neck which, when viewed in the transverse vehicle direction, is narrower than the adjacent restraint part of the airbag.

3. The vehicle occupant restraint system according to claim 2, wherein prior to activation the airbag is folded into an airbag package which comprises a folded main portion and a folded connecting portion, with the main portion containing the folded restraint part and the connecting portion containing the folded neck.

4. The vehicle occupant restraint system according to claim 3, wherein the connecting portion and the main portion are folded and positioned in the airbag package so that after activation of the inflator at first the neck is filled, thus causing the connecting portion to stretch and to deploy and causing the folded main portion to be moved toward the vehicle interior, wherein the tether remains intact at least until the main portion starts deploying within the vehicle interior.

5. The vehicle occupant restraint system according to claim 1, wherein in the completely inflated state the airbag extends within the vehicle interior from an area of a sun visor along the windshield to and over the instrument panel in the direction of a vehicle occupant.

6. The vehicle occupant restraint system according to claim 1, wherein the airbag includes a second free end which in the completely inflated state is located at a transition of the windshield to the instrument panel.

7. The vehicle occupant restraint system according to claim 6, wherein the airbag comprises a first outer wall portion extending from the inflation end to the second free end and forming a bearing surface against the windshield, a second outer wall portion extending from the second free end to the first free end over the instrument panel and a third outer wall portion which is at least partially opposite to the first and second outer wall portions and which extends from the first free end to the inflation end and forms a baffle for the vehicle occupant.

8. The vehicle occupant restraint system according to claim 7, wherein in the non-inflated deployed state of the airbag the third outer wall portion includes an inwardly folded bag in an area of the transition from the first to the second outer wall portion.

9. The vehicle occupant restraint system according to claim 8, wherein the bottom of the inwardly folded bag is connected to the second free end via another tether.

10. The vehicle occupant restraint system according to claim 6, wherein that in a partially inflated state of the airbag in which the tether has not yet become detached, the airbag extends along the windshield to the instrument panel and is turned over from the second free end and extends back toward the inflator so that the airbag takes a U-shaped configuration comprising the outer leg and the inner leg.

11. The vehicle occupant restraint system according to claim 10, wherein at the time when the tether becomes detached, the outer leg of the airbag is already partially filled with filling gas and the inner leg is still substantially unfilled.

12. The vehicle occupant restraint system according to claim 1, wherein that during deployment of the airbag the tether extends, as long as it is intact, maximally about 5 to 50 cm from the roof liner of the vehicle into the vehicle interior.

13. The vehicle occupant restraint system according to claim 1, wherein on the airbag side the tether is not fastened directly to the first free end, the tether being offset against the first free end by about 5 to 30 cm in the longitudinal direction of the airbag.

14. The vehicle occupant restraint system according to claim 1, wherein that the tether has an inflator-side end which is fixed on the inflator.

15. The vehicle occupant restraint system according to claim 1, wherein the airbag module is mounted beneath the roof liner in the area of a sun visor of the vehicle.

16. A method of folding an airbag of a vehicle occupant restraint system, comprising the steps of:
providing an airbag module including an inflator and a frontally acting airbag, wherein the airbag includes an inflator-side inflation end as well as a first free end delimiting a restraint part of the airbag which comprises a major part of the inflatable volume of the airbag, wherein the first free end in the inflated state of the airbag is located in a vehicle interior and wherein in a first period during deployment of the airbag the first free end is still connected to the airbag module via a tether in the area of the inflation end and upon reaching a predetermined tensile force the tether becomes detached and releases the first free end;
spreading the non-inflated airbag so that a second free end is maximally distant from the inflation end and a first outer wall portion is stretched in the longitudinal direction of the airbag, and the first free end is located in the vicinity of the inflation end and a second outer wall portion is stretched in the longitudinal direction of the airbag, with a third outer wall portion of the airbag being folded back onto itself at least in a portion,
folding two areas of the spread airbag laterally with respect to the longitudinal direction of the airbag toward the center,
rolling up the airbag from the second free end, and
fixing the tether in the area of the inflation end.

17. The method according to claim 16, wherein
that a neck of the airbag which merges into the inflation end of the airbag is excluded from the step of rolling-up and is folded in a zigzag folding.

18. The method according to claim 16, wherein that prior to the rolling step the first free end is turned over once in the longitudinal direction.

19. The method according to claim 16, wherein folding two areas of the spread airbag laterally with respect to the longitudinal direction of the airbag toward the center comprises Z folding the two areas along folding lines.

* * * * *